(12) United States Patent
Endoh et al.

(10) Patent No.: US 11,325,209 B2
(45) Date of Patent: May 10, 2022

(54) WELDING MONITORING SYSTEM

(71) Applicant: HITACHI, LTD., Tokyo (JP)

(72) Inventors: Hisashi Endoh, Tokyo (JP); Hiroshi Yoshikawa, Tokyo (JP); Toshihiro Yamada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 742 days.

(21) Appl. No.: 16/311,710

(22) PCT Filed: Mar. 15, 2017

(86) PCT No.: PCT/JP2017/010495
§ 371 (c)(1),
(2) Date: Dec. 20, 2018

(87) PCT Pub. No.: WO2018/003202
PCT Pub. Date: Jan. 4, 2018

(65) Prior Publication Data
US 2019/0210159 A1     Jul. 11, 2019

(30) Foreign Application Priority Data

Jun. 28, 2016  (JP) .............................. JP2016-127887

(51) Int. Cl.
*B23K 31/12*     (2006.01)
*G01N 27/20*     (2006.01)
(Continued)

(52) U.S. Cl.
CPC ........ *B23K 31/125* (2013.01); *B23K 11/0026* (2013.01); *B23K 11/25* (2013.01);
(Continued)

(58) Field of Classification Search
CPC .. B23K 2101/006; B23K 31/00; B23K 11/08; B23K 11/257; B23K 11/253;
(Continued)

(56) References Cited

U.S. PATENT DOCUMENTS 4,714,816 A * 12/1987 Pazzaglia ............. B23K 11/257
  219/109
8,445,809 B2   5/2013 Fernandez et al.
(Continued)

FOREIGN PATENT DOCUMENTS

DE   10 2007 031 982 A1    1/2009
DE      102007031982 A1 *  1/2009  ............. B23K 11/25
(Continued)

OTHER PUBLICATIONS

Extended European Search Report received in corresponding European Application No. 17819571.5 dated Jan. 8, 2020.
(Continued)

*Primary Examiner* — Dana Ross
*Assistant Examiner* — Kuangyue Chen
(74) *Attorney, Agent, or Firm* — Mattingly & Malur, PC

(57) ABSTRACT

To improve quality control of welding, there is included in resistance welding: a magnetic field measuring unit (205) disposed around a welded part and configured to measure a local current at the welded part; a high-speed camera (202) configured to capture an image for measuring local temperature at the welded part from variation of luminance of emission by capturing light emission state of the welded part; a comparison determination unit (106) configured to determine whether or not at least one of current information and temperature information has an abnormal value by comparing the current information calculated based on magnetic field information acquired from the magnetic field measuring unit with past current information and comparing the temperature information measured from an image of the high-speed camera (202) with past temperature information.

6 Claims, 27 Drawing Sheets

(51) Int. Cl.
*G01J 5/08* (2022.01)
*B23K 11/10* (2006.01)
*B23K 11/25* (2006.01)
*B23K 31/00* (2006.01)
*B23K 11/00* (2006.01)
*B23K 103/04* (2006.01)
*B23K 101/00* (2006.01)

(52) U.S. Cl.
CPC ............... *B23K 31/00* (2013.01); *G01J 5/08* (2013.01); *G01N 27/20* (2013.01); *B23K 2101/006* (2018.08); *B23K 2103/04* (2018.08)

(58) Field of Classification Search
CPC  B23K 11/25; B23K 2103/04; B23K 11/0026; B23K 31/125; G01J 5/08; G01N 27/20
See application file for complete search history.

(56) References Cited

U.S. PATENT DOCUMENTS

| | | | |
|---|---|---|---|
| 2019/0134754 A1* | 5/2019 | Jacquemetton | B23K 26/342 |
| 2019/0323828 A1* | 10/2019 | Hiramoto | B23K 31/00 |
| 2021/0063316 A1* | 3/2021 | Endou | B23K 31/125 |

FOREIGN PATENT DOCUMENTS

| | | | |
|---|---|---|---|
| FR | 2696369 A1 | 4/1994 |
| JP | 03-086382 A | 4/1991 |
| JP | 05-337663 A | 12/1993 |
| JP | 09-010970 A | 1/1997 |
| JP | 10-235490 A | 9/1998 |
| JP | 11-090644 A | 4/1999 |
| JP | 2003-080394 A | 3/2003 |
| JP | 2005-342788 A | 12/2005 |
| JP | 2008-216064 A | 9/2008 |
| JP | 2012-020336 A | 2/2012 |
| JP | 2012-145394 A | 8/2012 |
| JP | 2012-236215 A | 12/2012 |
| JP | 2014-182530 A | 9/2014 |
| KR | 10-1439758 B1 | 9/2014 |

OTHER PUBLICATIONS

Korean Office Action received in corresponding Korean Application No. 10-2018-7036344 dated Dec. 19, 2019.
International Search Report of PCT/JP2017/010495 dated May 9, 2017.

* cited by examiner

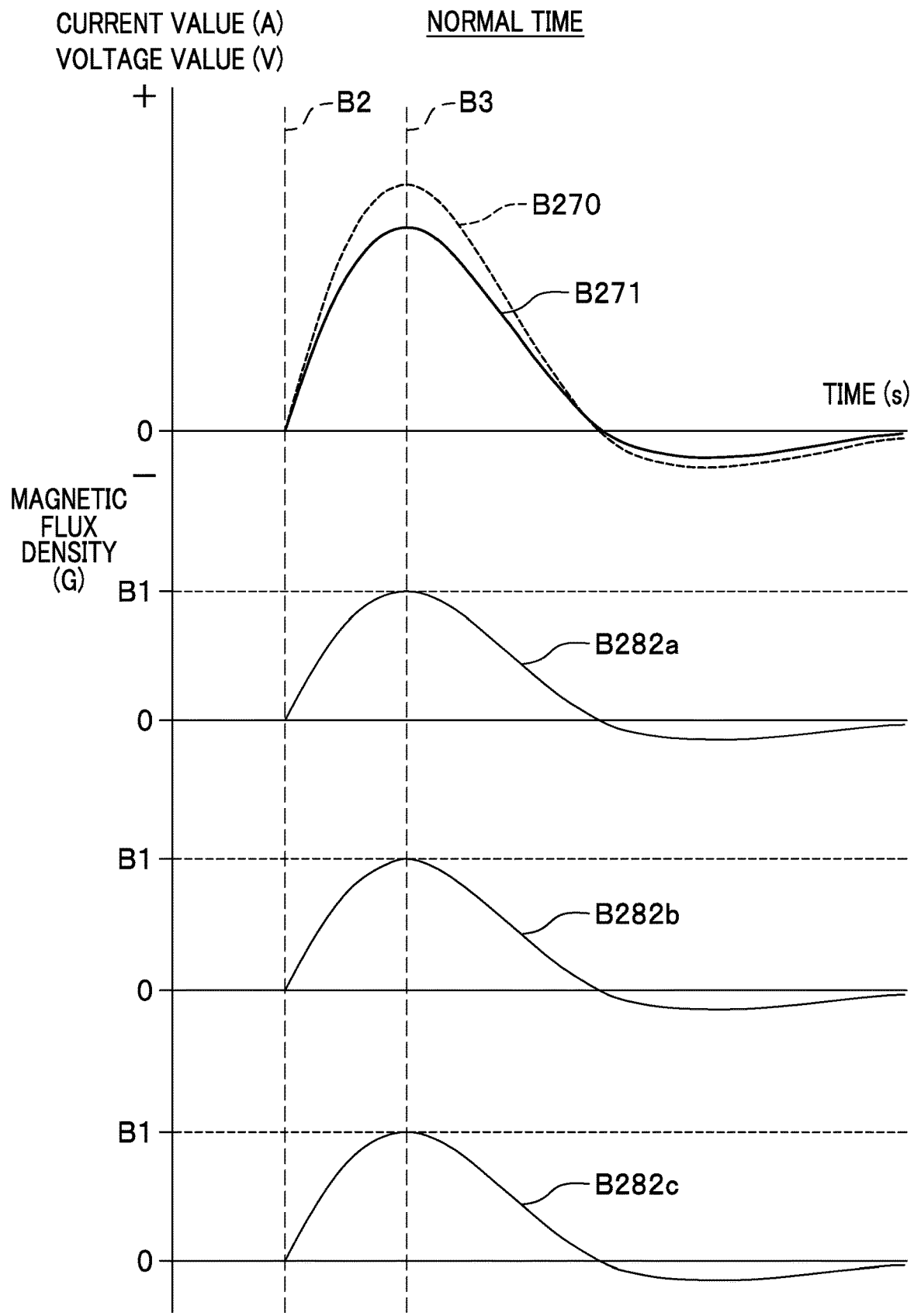

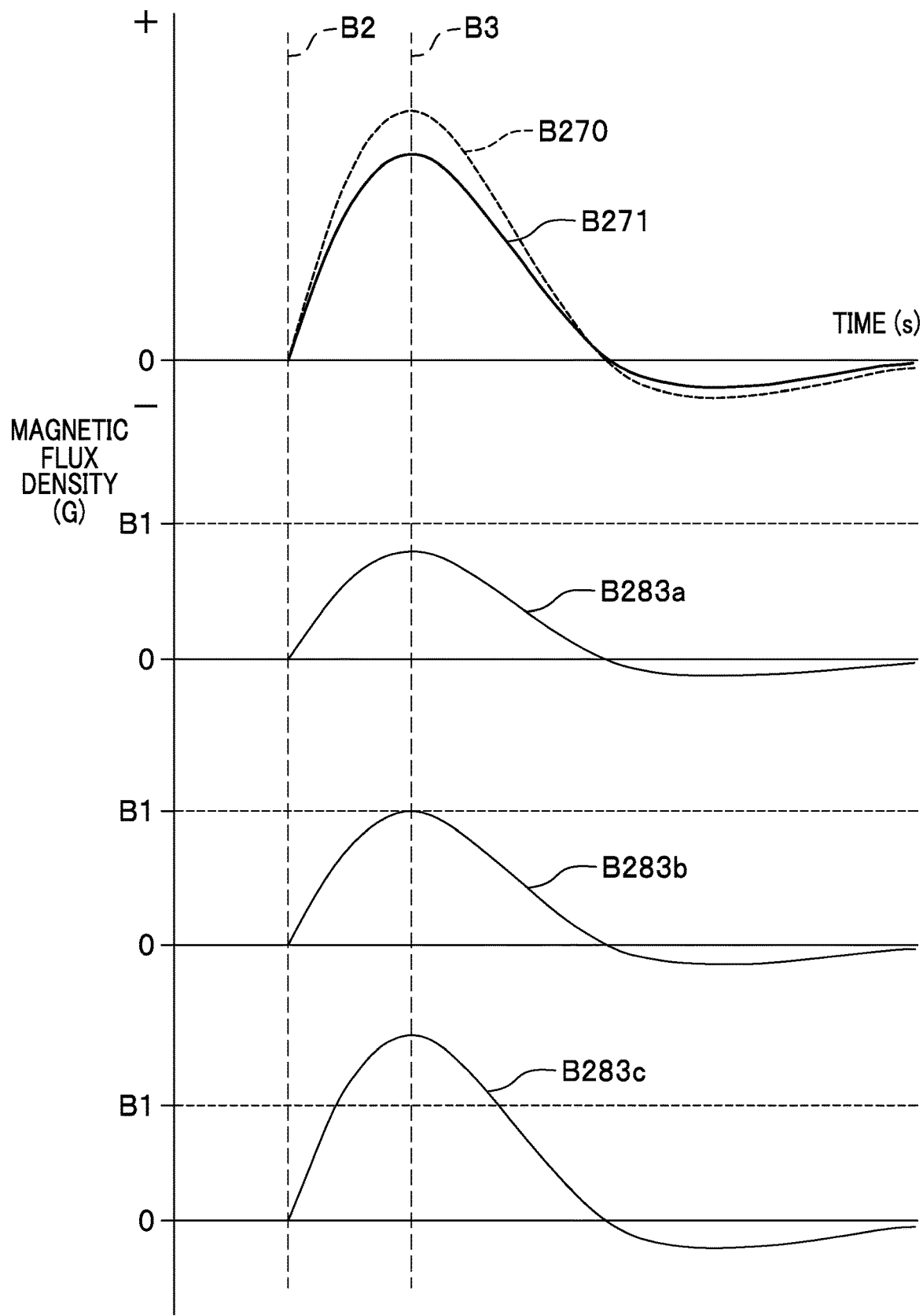

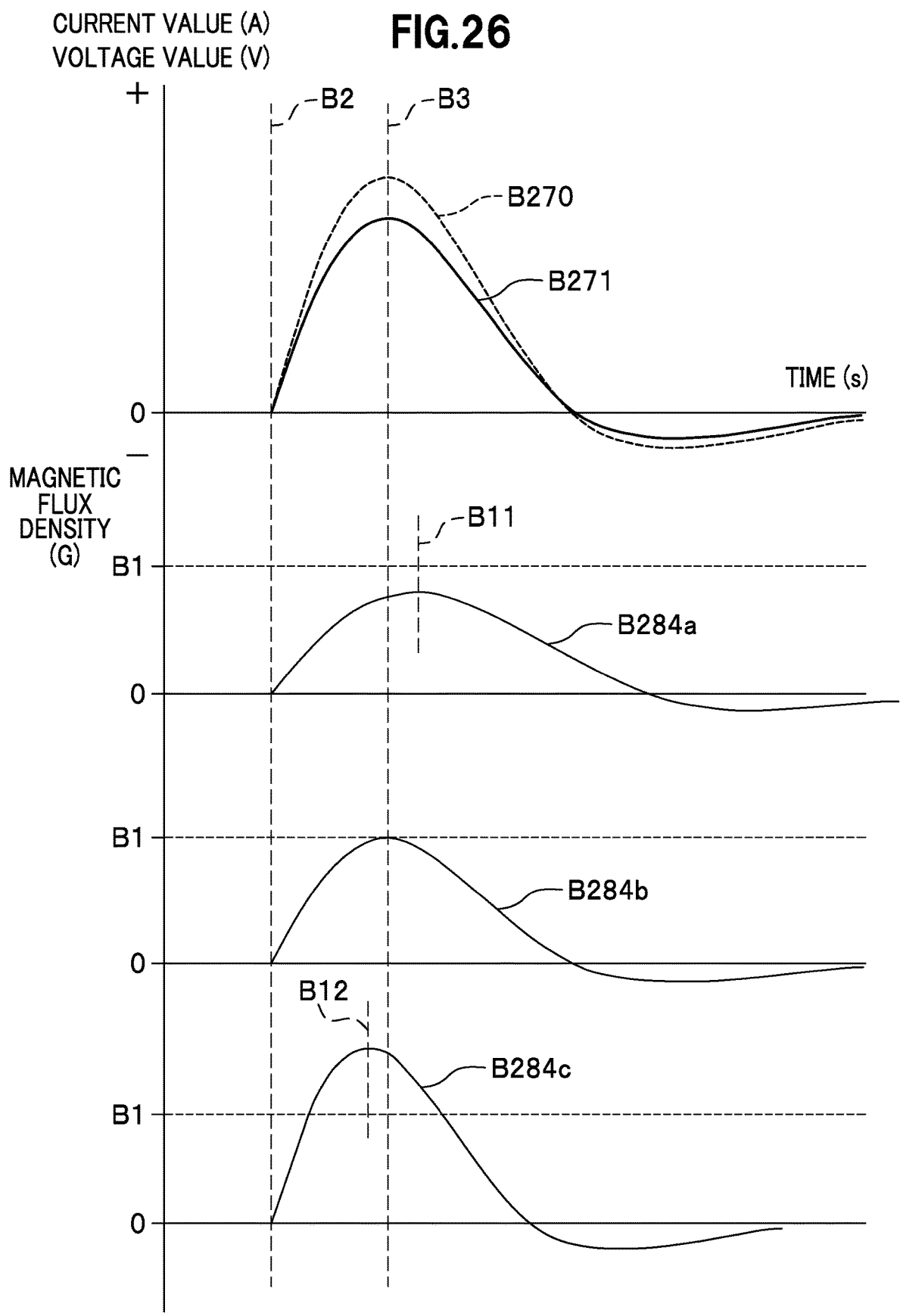

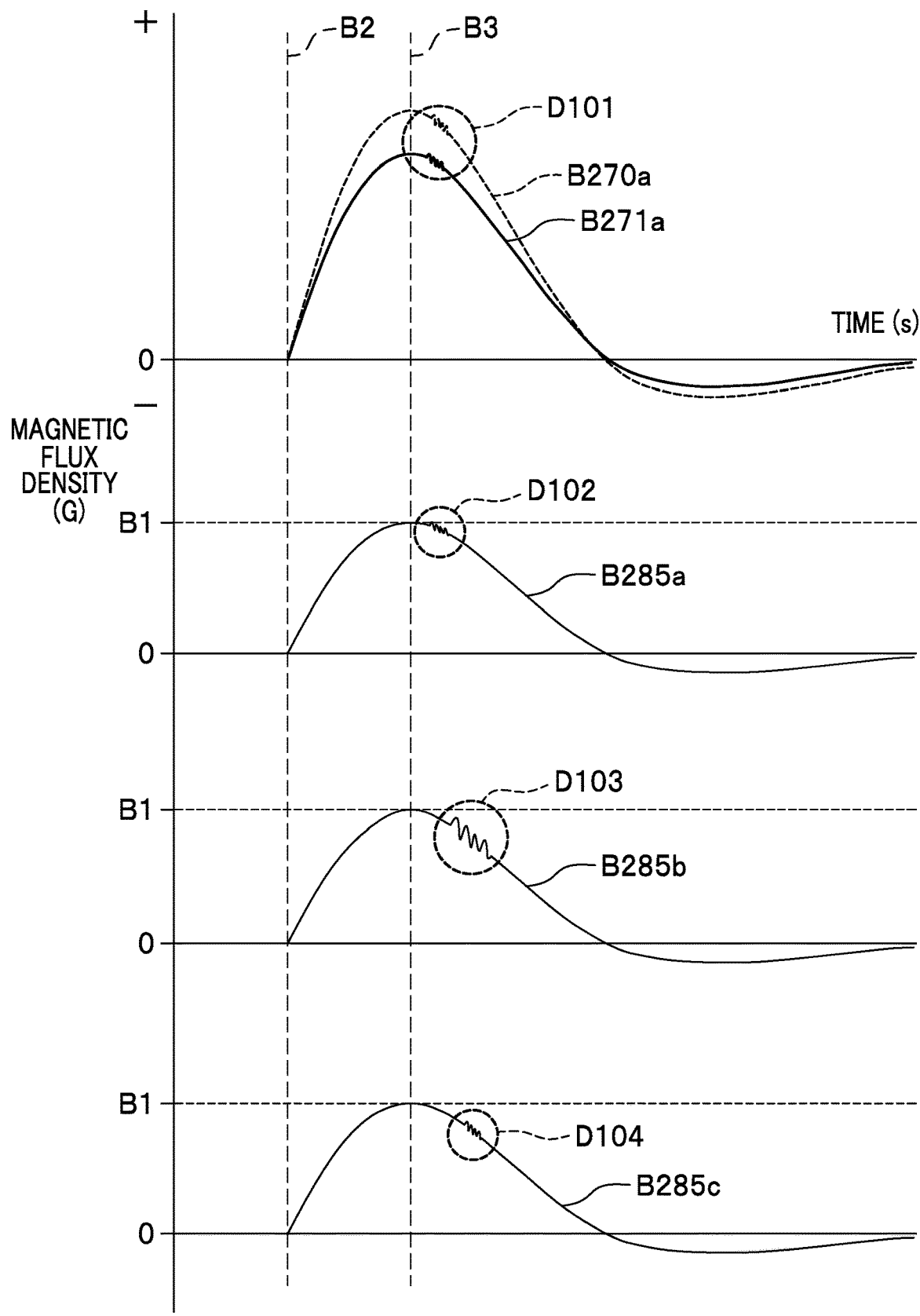

WELDING MONITORING SYSTEM

TECHNICAL FIELD

The present invention relates to a technique of a welding monitoring system for performing quality control in welding.

BACKGROUND ART

Welding is an essential technique for joining multiple members of metal products. A degree of freedom of the shape of a product is enhanced, and certain intensity is obtained by welding. For this reason, welding is often used for joining related to joints of a structure and a pressure vessel subject to a high stress load.

Welding is performed by applying heat to a desired jointing portion, and melting a metal member (hereinafter referred to as a member). Welding has various methods when classified by heating method. Among all, welding using electric resistance is called spot welding or resistance welding (hereinafter referred to as resistance welding), and is often adopted for joining in automobiles and thin sheet metal. The principle of resistance welding is that a current is applied to a member, and a welded part is heated utilizing Joule heat generated by electric resistance of metal. The characteristics of resistance welding are that an additional member for filling between the members to be welded is not necessary, and thus resistance welding is suitable for automatic welding, and welding can be completed in a short time by applying a high current. Thus, resistance welding is often utilized for a mass production line for metal products.

In order to apply resistance welding to a mass production line, a trial experiment using actual members is performed, and conditions (welding conditions) suitable for the welding target are found out. The welding conditions include pre-welding conditions, such as a surface state of each member, a method for bringing the members into close contact; during-welding conditions, such as an application voltage, a current, and a pressing pressure between the members; and post-welding conditions such as cooling.

When such welding conditions are determined then mass production is started, a phenomenon, which cannot be simulated in the trial experiment, may occur, and it may be necessary to change the welding conditions. In general, after mass production is started, it is difficult to change the manufacturing conditions. Meanwhile, quality check is generally performed by random inspection of the parts manufactured by mass production. Specifically, a technique has been disclosed, in which a marker (joint information) or the like is applied to a welding material in such a random inspection, and an image of a welded part is acquired and managed.

For instance, Patent Literature 1 discloses "a welding monitoring system 1 including: an image processing program 51 that determines whether an appropriate welding material 25 is used for a joint 10 in which joint information 11 is written, identifies the joint information 11 from a camera 30 and an image of the joint 10 captured by the camera 30, and determines the joint 10 from the identified joint information 11; a database 52 that identifies the welding material 25 in association with the joint 10; and a first determination program 55 that determines whether an appropriate welding material 25 is used for the joint 10. The first determination program 55 compares the joint 10 identified by the image processing program 51 with the joint 10 associated with the welding material 25 identified by the database 52, and determines whether an appropriate welding material 25 is used for the joint 10" (see ABSTRACT).

CITATION LIST

Patent Literature

Patent Literature 1: Japanese Patent Application Publication No. 2014-182530

SUMMARY OF INVENTION

Technical Problem

The technique described in Patent Literature 1 determines whether an appropriate welding member is used, and whether the welding conditions (a welding current, a welding temperature, a preheat temperature, and a welding time) are in a range of predetermined welding conditions.

However, even when an appropriate welding member is used and welding is performed under appropriate welding conditions, appropriate welding may not be performed because the welded part is not uniform or foreign particles are mixed into the welded part. With the technique described in Patent Literature 1, when such a situation occurs, the situation cannot be coped with appropriately.

The present invention has been devised in consideration of the above-mentioned background, and it is an object of the present invention to improve quality control of welding.

Solution to Problem

In order to solve the above-mentioned problem, an aspect of the present invention includes: a current measuring unit configured to measure a local current at a welded part in resistance welding; a temperature measuring unit configured to measure a local temperature at the welded part; and a determination unit configured to determine whether or not at least one of current information acquired from the current measuring unit and temperature information acquired from the temperature measuring unit is abnormal by comparing the current information acquired from the current measuring unit with past current information and comparing the temperature information acquired from the temperature measuring unit with past temperature information.

Other solutions will be described in an embodiment.

Advantageous Effects of Invention

According to the present invention, quality control of welding can be improved.

BRIEF DESCRIPTION OF DRAWINGS

FIG. 14A is a graph illustrating an example of spectral data, and FIG. 14B is a graph illustrating an example of one-dimensional spectral data.

FIG. 15A is a graph illustrating an example of spectral data, and FIG. 15B is a graph illustrating an example of one-dimensional spectral data.

FIG. 16A is a graph illustrating an example of spectral data, and FIG. 16B is a graph illustrating an example of one-dimensional spectral data.

FIG. 18A illustrates entire graphs the current waveform and the voltage waveform, and FIG. 18B is an enlarged graph near a peak value.

FIG. 18A illustrates entire graphs the current waveform and the voltage waveform, and FIG. 18B is an enlarged graph near a peak value.

FIG. 20A is a diagram illustrating an example of installation of magnetic sensors according to the embodiment, and FIG. 20B is a graph illustrating output waveforms of the magnetic sensors.

FIG. 21A is an arrangement perspective view illustrating the magnetic sensors, FIG. 21B is a cross-sectional view taken along A-A of FIG. 21A, and FIG. 21C is a view as seen from B-B direction of FIG. 21B.

FIG. 23A is a view for explaining a current and a magnetic field flowing through the entire welding work, and FIG. 23B is a view illustrating the direction of a local current, and the direction of a magnetic field.

FIG. 24 is a graph (part one) illustrating an example of a magnetic field waveform.

FIG. 25 is a graph (part two) illustrating an example of a magnetic field waveform.

FIG. 26 is a graph (part three) illustrating an example of a magnetic field waveform.

FIG. 27 is a graph (part four) illustrating an example of a magnetic field waveform.

FIG. 29A is a diagram illustrating an example of installation of a displacement meter, and FIG. 29B is a graph illustrating a result of measurement by the displacement meter.

DESCRIPTION OF EMBODIMENTS

Next, a mode (referred to as an "embodiment") for carrying out the present invention will be described in detail as needed with reference to the drawings.

[Welding Monitoring System Z1]

Figure 1:
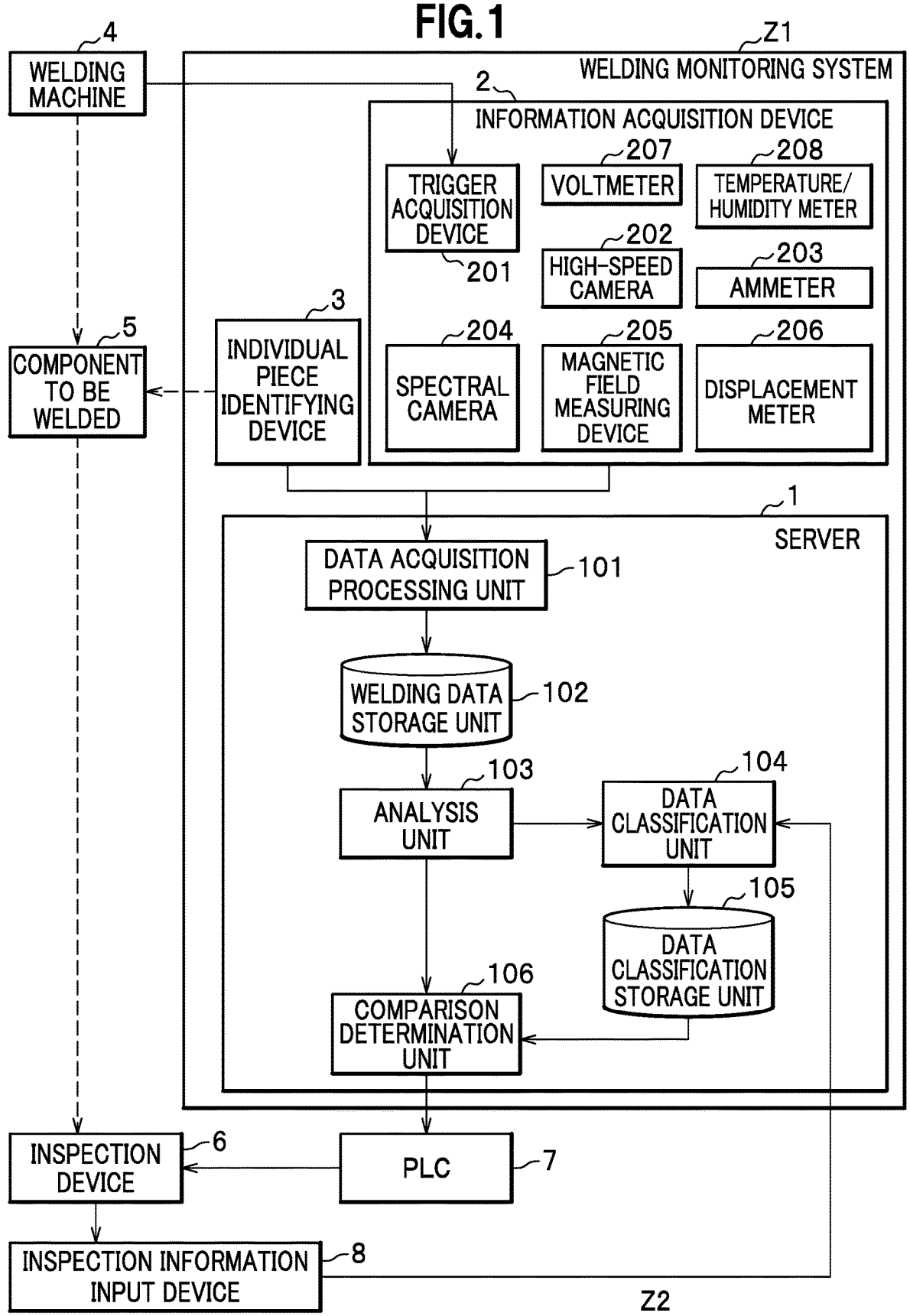
FIG. 1 is a functional block diagram of a welding monitoring system according to an embodiment.

FIG. 1 is a functional block diagram of a welding monitoring system Z1 according to the embodiment.

The welding monitoring system Z1 includes a server 1, an information acquisition device 2, and an individual piece identifying device 3.

Furthermore, a welding system Z2 includes the welding monitoring system Z1, a welding machine 4, an inspection device 6, a PLC 7, and an inspection information input device 8.

The information acquisition device 2 is installed in the welding machine 4, and includes various measuring instruments and various sensors.

Specifically, the information acquisition device 2 has a trigger acquisition device 201, a high-speed camera (temperature measuring unit) 202, an ammeter 203, a spectral camera 204, a magnetic field measuring device (a current measuring unit, a magnetic field measuring unit) 205, a displacement meter (displacement measuring unit) 206, a voltmeter 207, and a temperature/humidity meter 208.

The trigger acquisition device 201 acquires a trigger signal when a current is made to pass through a component 5 to be welded in the welding machine 4.

The high-speed camera 202 captures a light emission state of a welded part when a current flows through the welded part in resistance welding. The details of the high-speed camera 202 will be described later.

The ammeter 203 measures a current which flows through the component 5. The ammeter 203 will be described later.

The spectral camera 204 is a camera for performing spectral analysis of light emission of the welded part when a current flows through the welded part in resistance welding, and a streak camera or the like used. The details of the spectral camera 204 will be described later.

The magnetic field measuring device 205 is installed in the periphery of a welded part to measure a magnetic field from the welded part. The magnetic field measuring device 205 will be described later.

The displacement meter 206 measures the length of a welding member. The displacement meter 206 will be described later.

The voltmeter 207 measures a voltage across electrodes when a current is passed through the component 5 to be welded. The voltmeter 207 will be described later.

The temperature/humidity meter 208 measures a temperature and a humidity in the inspection environment, and a temperature meter and a humidity meter may be separated.

In addition, a pressure gauge, which measures a pressure applied to the welded part (not illustrated), may be provided.

(Individual Piece Identifying Device 3)

The individual piece identifying device 3 reads for a marker information on ID which identifies an individual piece of welding (welding individual piece), and identifies the welding individual piece. The marker refers to a bar code attached to the component 5 to be welded, an engraved mark on the component 5 to be welded, and a RFID (Radio Frequency Identification) tag. When the marker is a bar code, the individual piece identifying device 3 is a bar code reader. When the marker is an engraved mark, the individual piece identifying device 3 includes a camera that captures an engraved mark, and an engraved mark recognition device that extracts the engraved mark from a captured image, and performs character recognition. When the marker is a RFID tag, the individual piece identifying device 3 is a RFID tag reader.

It is to be noted that when the marker is an engraved mark, the high-speed camera 202 of the information acquisition device 2 may be used as a camera that captures a marker. It is to be noted that when the marker is an engraved mark, the technique described in Patent Literature 1 may be used as a method of identifying a welding individual piece, and a description here is omitted.

Here, a welding individual piece is for distinguishing each welding. For instance, when welding is performed at two positions in a component 5 to be welded, each welding is considered as a welding individual piece. When welding is performed multiple times at the same welding position, each welding may be considered as a welding individual piece, or welding for multiple times may be collectively considered as a welding individual piece.

(Server 1)

A server 1 has a data acquisition processing unit 101, a welding data storage unit 102, an analysis unit 103, a data classification unit 104, a data classification storage unit 105, and a comparison determination unit (determination unit) 106.

The data acquisition processing unit 101 acquires welding data from each device in the information acquisition device 2, and acquires data for individual piece identification from the individual piece identifying device 3. The data acquisition processing unit 101 stores the acquired welding data and data for individual piece identification in the welding data storage unit 102.

In the welding data storage unit 102, each device in the information acquisition device 2 and data sent from the individual piece identifying device 3 are stored in association with each other. Specifically, the welding data storage unit 102, identification information of a welding individual piece identified by the individual piece identifying device 3, and information (time series information) acquired from each device of the information acquisition device 2 are associated with each other and stored. The data stored in the welding data storage unit 102 is such that waveform data of each measuring instrument and each sensor, and image data of the camera are stored as data with shared (synchronized) time-axis due to synchronization of trigger signals acquired by the trigger acquisition device 201.

The analysis unit 103 creates database of the characteristics of welding conditions based on the information acquired from each device of the information acquisition device 2. The processing of the analysis unit 103 will be described later.

The data classification unit 104 classifies welding data by machine learning (pattern recognition) or the like. A clustering method, or k-means method and the like is used in machine learning. The data classification unit 104 stores a result of machine learning into the data classification storage unit 105. Here, the data classification unit 104 classifies analysis results calculated by the analysis unit 103 using machine learning. However, without being limited to this, the analysis results calculated by the analysis unit 103 may be classified by a technique other than machine learning. The processing of the data classification unit 104 will be described later.

The data classification storage unit 105 stores the results of machine learning by the data classification unit 104. In other words, past data obtained using machine learning is stored in the data classification storage unit 105.

The comparison determination unit 106 compares the results of machine learning stored in the data classification storage unit 105 with the results of calculation by the analysis unit 103, and determines whether welding conditions are normal or abnormal. When determining that welding conditions are abnormal, the comparison determination unit 106 causes a PLC (Programmable Logic Controller) 7 to output detailed inspection instruction.

When the PLC 7 outputs a detailed inspection instruction to the inspection device 6, the inspection device 6 causes a display device (not illustrated) to display information on the component 5 to be welded in which abnormality (there is a possibility of defects in welding) has been detected in the server 1. An inspector performs detailed inspection of the component 5 to be welded based on the displayed information. A result of inspection analysis is sent to the data classification unit 104 via the inspection information input device 8, and data of machine learning.

[Manufacturing System Z]

First, a usage scene of the embodiment will be described with reference to FIGS. 2 and 3. Since the welding system Z2 has been described in FIG. 1, a description here is omitted.

Figure 2:
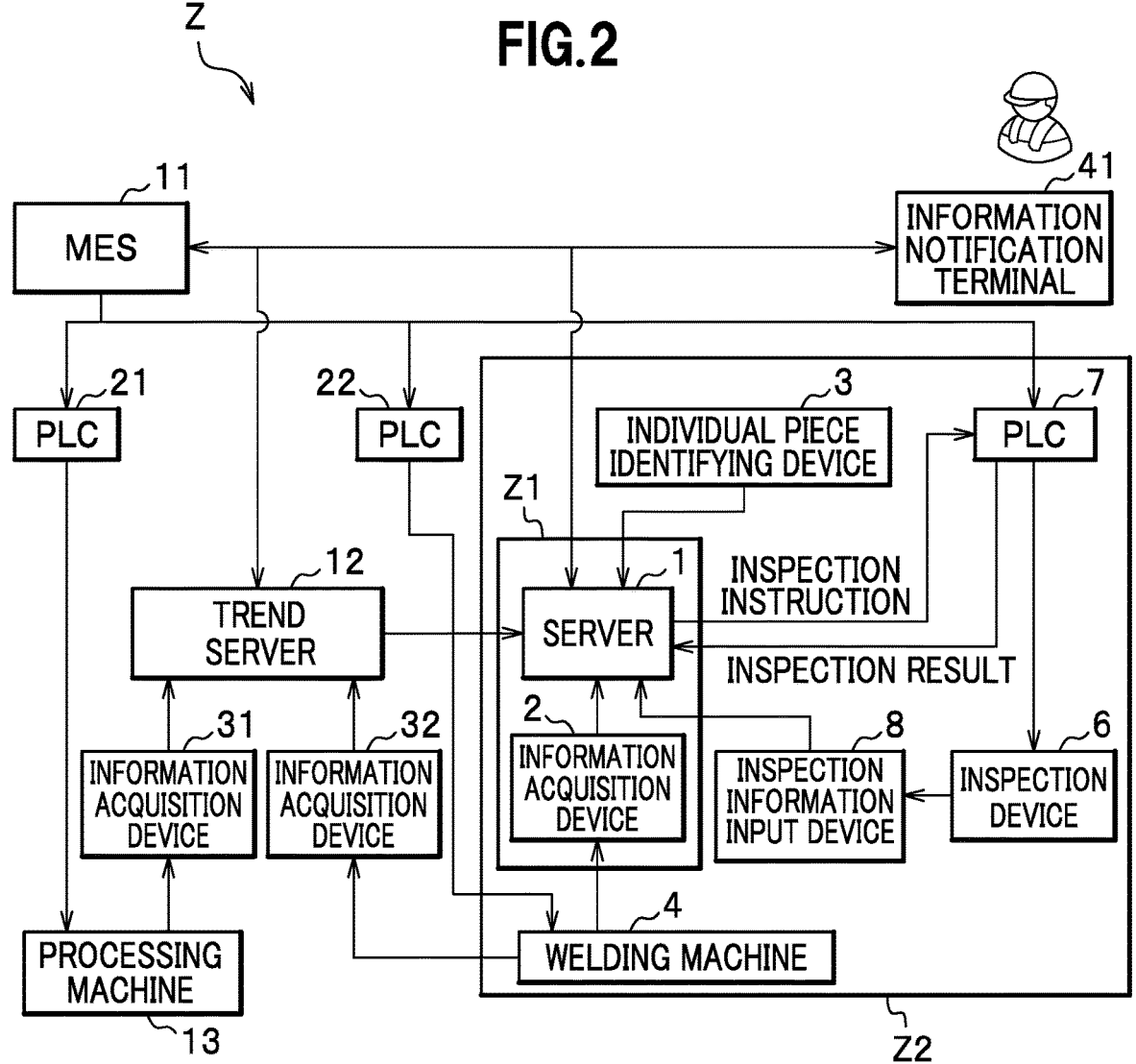
FIG. 2 is a functional block diagram of a manufacturing system Z which cooperates with MES (Manufacturing Execution System).

FIG. 2 is a functional block diagram of a manufacturing system Z which cooperates with a manufacturing execution system (MES 11). The MES 11 has a role of managing the operation of production facilities of the factory and the work of workers while linking to each step of a production line in a factory which has a welding process. The MES 11 has management information on planning, present conditions, and record of accomplishment.

Each of the production facilities, such as a processing machine 13, the welding machine 4, and the inspection device 6, transmits and receives a command according to management information stored in the MES 11 to and from the MES 11 via the PLC 7, 21 and 22 serving as sequencers, and operates.

The processing machine 13 processes the component 5 to be welded which is supplied to the welding machine 4. A trend server 12 acquires information on the state of the processing machine 13 from the processing machine 13 via an information acquisition device 31. Similarly, the trend server 12 acquires information on the state of the welding machine 4 from the welding machine 4 via an information acquisition device 32. Here, the information acquisition devices 31, 32 are various sensors or the like.

The trend server 12 stores the acquired information on the state of the welding machine 4 and the processing machine 13.

The MES 11 transmits the information on the state of the welding machine 4 and the processing machine 13 acquired by the trend server 12, and a component to be welded detailed inspection instruction outputted from the server 1 an information notification terminal 41 owned by a supervisor. The information notification terminal 41 is a wearable device information terminal such as a smartphone, a tablet, and an HMD (Head Mount Display).

In this manner, the manufacturing system Z according to the embodiment allows the trend server 12 having the information on the state of the processing machine 13 and the welding machine 4, and the MES 11 to cooperate with each other. It is to be noted that in the embodiment, when the server 1 detects welding abnormality, an inspection instruction is outputted in the order of the server 1→the PLC 7→the inspection device 6. However, an inspection instruction may be outputted in the order of the server 1→the MES 11→the PLC 7 the inspection device 6.

In addition, the manufacturing system Z transmits an inspection instruction, an inspection item for the component 5 to be welded determined to be abnormal by the server 1 to the inspection device 6 via the PLC 7 to allow the inspection device 6 to perform non-destructive inspection.

With this manufacturing system Z, when an inspection time is longer than a takt time in manufacturing, an inspector can recognize the component 5 to be welded (see FIG. 1) to be inspected or an inspection position in advance for the inspection device 6. Consequently, a production line can be operated without reducing the productivity, and total inspection can be achieved in a short time.

In addition, the manufacturing system Z allows the MES 11, the trend server 12, and the server 1 of the welding monitoring system Z1 to cooperate with each other, thereby transmitting information on the welding machine 4 in which abnormality has occurred, and the component 5 to be welded to a supervisor (the details will be described latter). Consequently, the manufacturing system Z can perform maintenance of the welding machine 4 quickly, and reduce the decrease in the productivity.

As described above, a wearable device information terminal such as a smartphone, a tablet, and an HMD (Head Mount Display) may be used as the information notification terminal 41. Furthermore, when AR (Augmented Reality) technology is used, in which an image in a factory, a device in which abnormality has occurred, and a portion of a component are superimposed and displayed on the information notification terminal 41, it is possible for a supervisor to cope with the abnormality more quickly.

Figure 3:
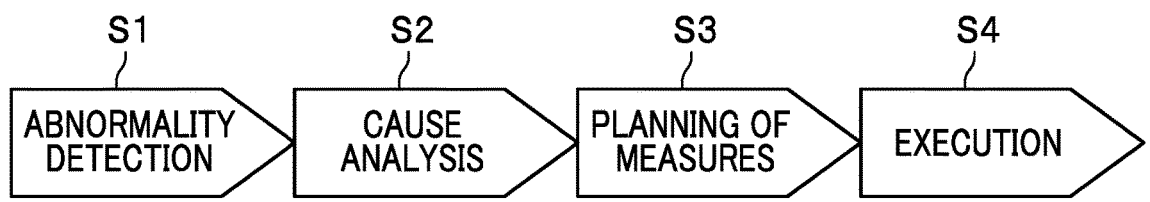
FIG. 3 is a flowchart illustrating the steps of manufacturing process in the manufacturing system of FIG. 2.

FIG. 3 is a flowchart illustrating the steps of manufacturing process in the manufacturing system Z of FIG. 2. FIG. 2 is referred to as needed.

As illustrated in FIG. 3, in the manufacturing process in the embodiment, processing is proceeded in the following order: abnormality detection (S1)→cause analysis (S2) →planning of measures (S3)→execution (S4). Hereinafter, two inspection step 1 and inspection step 2 will be shown. Between these inspection steps, the inspection step 2 is performed using the welding monitoring system Z1 according to the embodiment.

<Inspection Step 1>

(Abnormality Detection: S1)

In the step of abnormality detection of step S1, among the information acquired from the information acquisition devices 31, 32, the MES 11 acquires part or all of the information from the trend server 12. The MES 11 stores the values of record of accomplishment of the welding conditions, acquired from the information acquisition device 32.

(Cause Analysis: S2)

In the step of cause analysis of step S2, an inspector performs cause analysis of welding abnormality in consideration of the values of record of accomplishment of processing conditions before welding, and an image (analysis result) before welding in addition to the values of record of accomplishment of the welding conditions stored in the MES 11.

(Planning of Measures: S3)

In the step of planning of measures of step S3, an inspector performs statistical analysis of the relationship between the values of record of accomplishment of welding conditions, processing parameters of the welding machine 4, and a welding result, calculates the processing parameters of the welding machine 4, and updates the settings of the manufacturing system Z.

(Execution: S4)

In the step of execution of step S4, welding is performed with the processing parameters set in the step of planning of measures.

<Inspection Step 2>

The inspection step 2 is performed based on the inspection step 1 described above. As described above, the welding monitoring system Z1 in the embodiment is used in the "inspection step 2".

(Abnormality Detection: S1)

In the step of abnormality detection of step S1, when welding abnormality is determined in the server 1, the information notification terminal 41 owned by a supervisor, or a patrol lamp which is not illustrated is notified of the welding abnormality.

In addition, the server 1, which has detected the welding abnormality, outputs an inspection instruction to the inspection device 6. In the embodiment, the server 1 instructs the inspection device 6 to perform inspection via the PLC 7. However, as described above, the MES 11 may instruct the inspection device 6 to perform inspection.

(Analysis of Cause: S2)

In the step of the cause analysis of step S2, an inspector analyzes the cause of the welding abnormality in accordance with an instruction of a supervisor or a notification from a patrol lamp. Specifically, a supervisor instructs an inspector to perform inspection based on the information displayed on the information notification terminal 41 owned by the supervisor. Alternatively, when seeing flashing of a patrol lamp, an inspector stops the line, and performs detailed inspection of the component 5 to be welded which is to be inspected currently. At this point, an inspector performs analysis by utilizing the knowledge obtained as a result of the cause analysis in the inspection step 1.

(Planning of Measures: S3)

In the step of planning of measures of step S3, an inspector determines necessity of stopping or maintaining the line based on an abnormality occurrence frequency. An inspector calculates a predicted line stop time based on the result of cause analysis, and when determining that stopping a line due to abnormality is necessary for a certain period, the inspector issues an alternate production order to another line. Also, the inspector calculates new processing parameters using the processing parameters calculated in the planning of measures in the inspection step 1 as reference, and updates the settings of the manufacturing system Z.

(Execution: S4)

In the step of execution of step S4, the manufacturing system Z is executed based on the alternate production order or the new processing parameters.

[Hardware Configuration Diagram]

Figure 4:
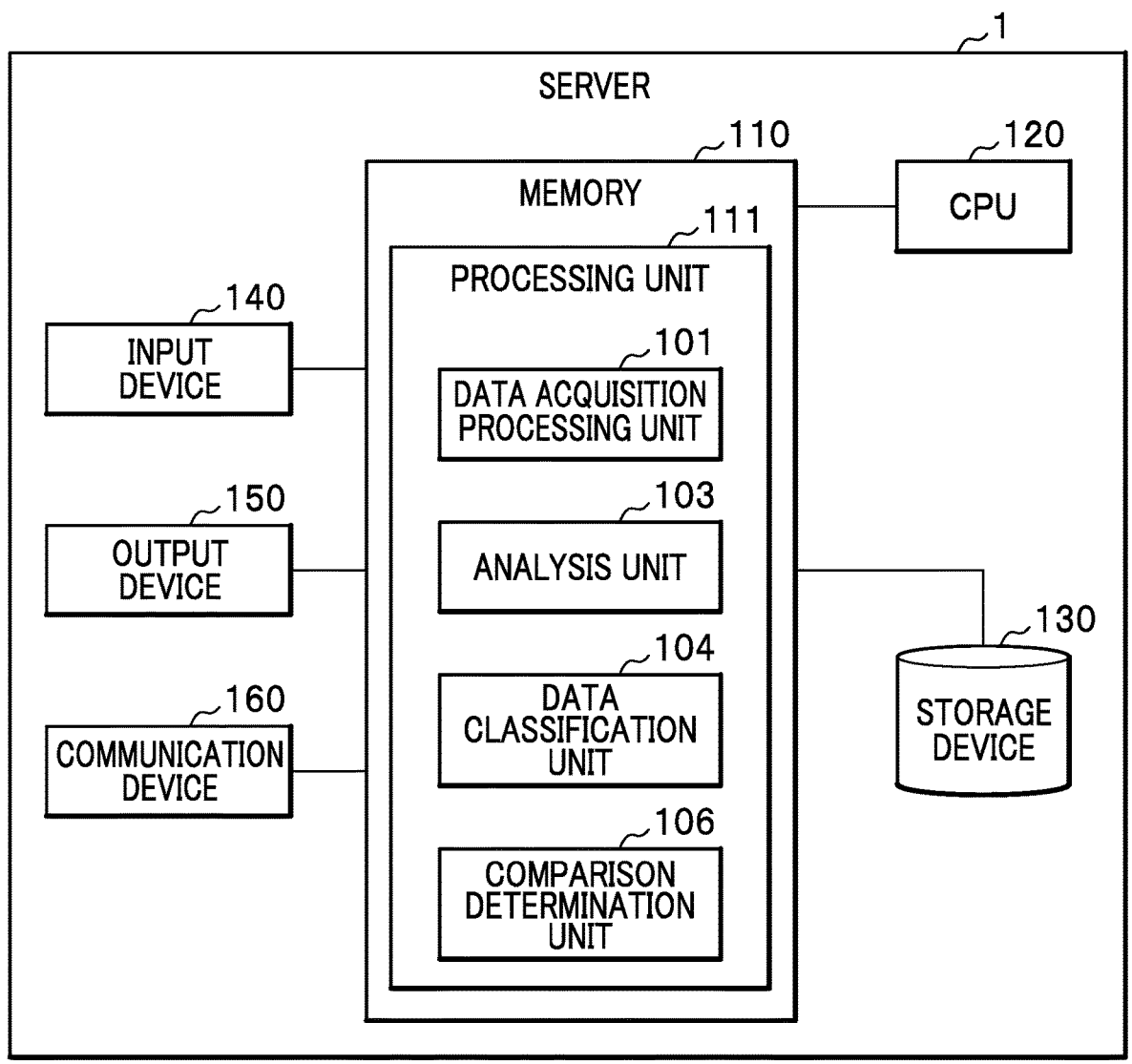
FIG. 4 is a hardware configuration diagram of a server according to the embodiment.

FIG. 4 is a hardware configuration diagram of the server 1 according to the embodiment.

The server 1 has a storage device 130 such as a memory 110, a CPU (Central Processing Unit) 120, and a HD (Hard Disk). In addition, the server 1 has an input device 140 such as a keyboard, a mouse; an output device 150 such as a display; each device in the information acquisition device 2 of FIG. 1; the individual piece identifying device 3; and a communication device 160 that performs communication with the PLC 7.

A program stored in the storage device 130 is loaded in the memory 110, and the program is executed by the CPU 120, thereby implementing a processing unit 111, the data acquisition processing unit 101, the analysis unit 103, the data classification unit 104, and the comparison determination unit 106. Since the data acquisition processing unit 101, the analysis unit 103, the data classification unit 104, and the comparison determination unit 106 have been described in FIG. 1, a description here is omitted.

It is to be noted that the storage device 130 corresponds to the welding data storage unit 102 and the data classification storage unit 105 of FIG. 1.

(Resistance Welding)

FIGS. 5 to 8 are views each illustrating a step of resistance welding.

Figure 5:
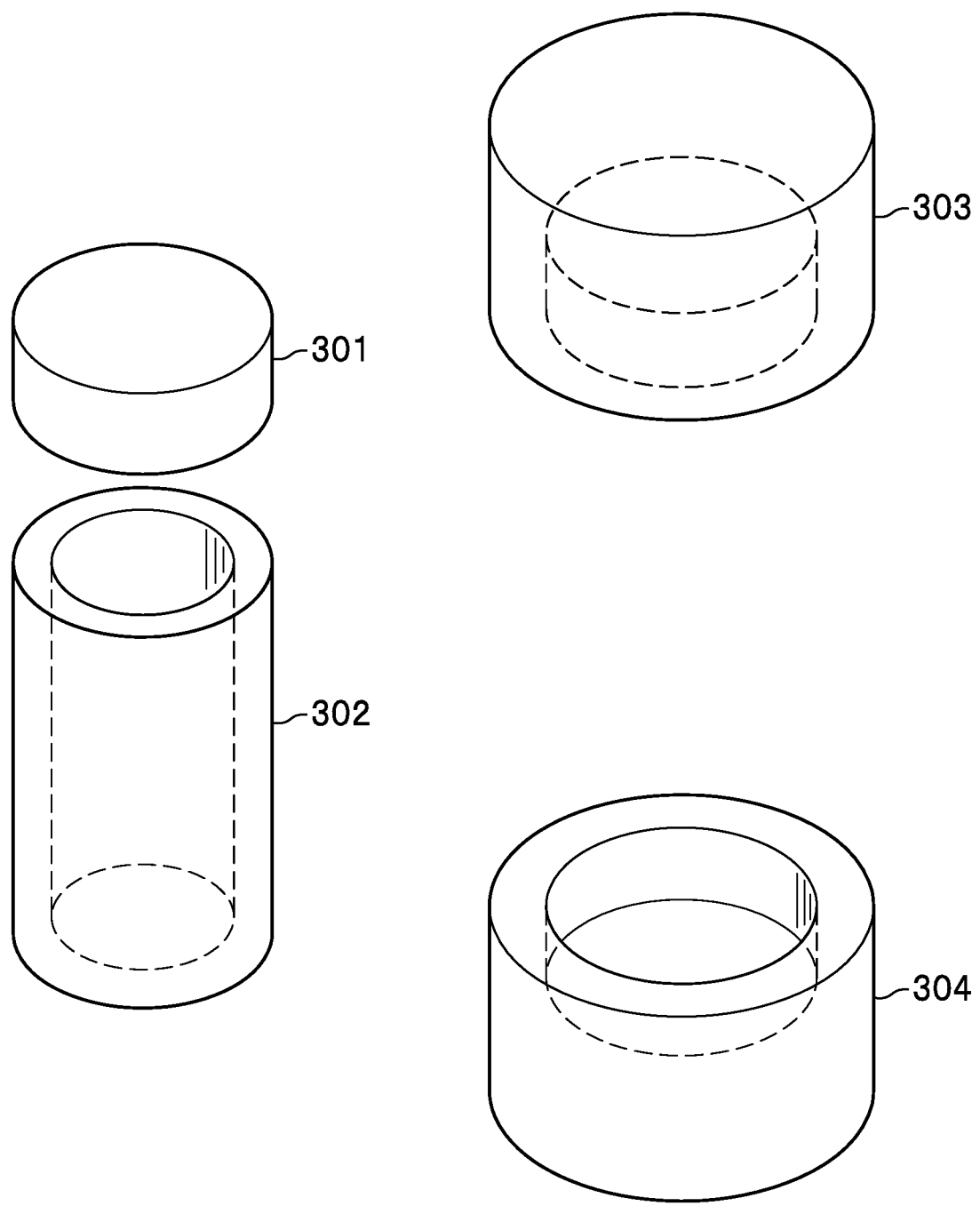
FIG. 5 is a view (part one) illustrating a step of resistance welding.
Figure 8:
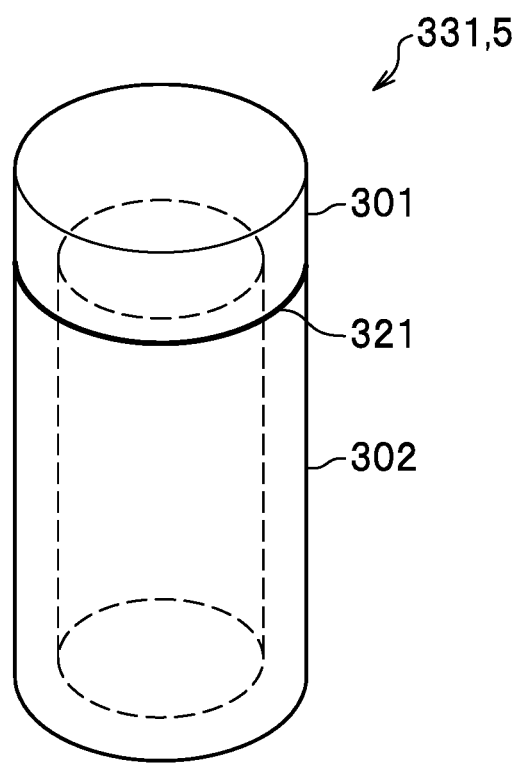
FIG. 8 is a view (part four) illustrating a step of resistance welding.

A member 301 to be welded and a member 302 to be welded included in the component 5 to be welded (see FIG. 1) illustrated in FIG. 5 are made of metal. As illustrated in FIG. 8, the lower end surface of the member 301 to be welded and the upper end face of the member 302 to be welded are butted to each other. Then welding (butt welding) is applied to the butted surfaces, and thus the member 301 to be welded and the member 302 to be welded are welded. Here, an electrode 303 and an electrode 304 illustrated in FIG. 5 are electrodes that supply a current to the members 301, 302 to be welded.

Figure 6:
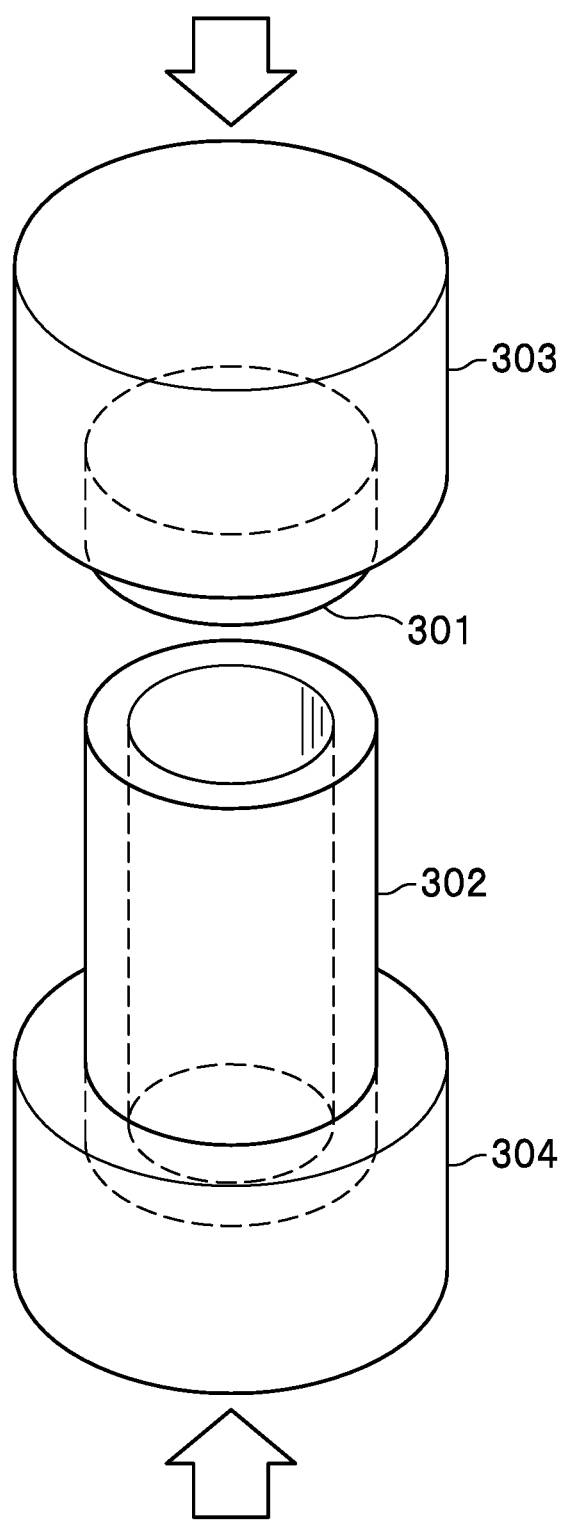
FIG. 6 is a view (part two) illustrating a step of resistance welding.
Figure 7:
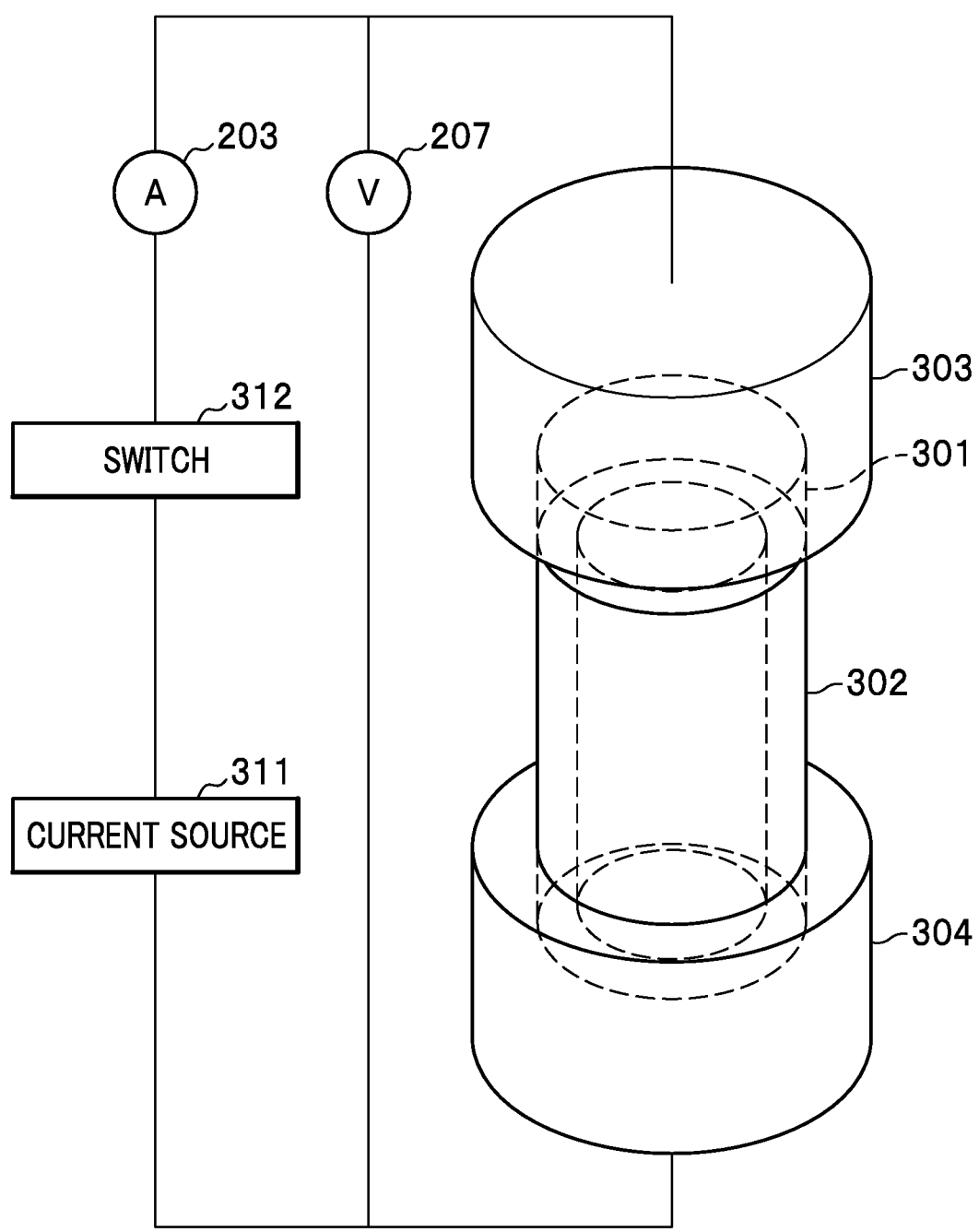
FIG. 7 is a view (part three) illustrating a step of resistance welding.

As illustrated in FIG. 6, the members 301, 302 to be welded stacked on the electrode 303, 304 are installed. Subsequently, the members 301, 302 to be welded are aligned, and pressure is applied in the direction of each arrow in FIG. 6. Subsequently, as illustrated in FIG. 7, a current source 311, a switch 312, the ammeter 203, and the voltmeter 207 are connected to the electrodes 303, 304 with the members 301, 302 to be welded set in the electrodes 303, 304. The ammeter 203 is the ammeter 203 in the information acquisition device 2 (see FIG. 1). The ammeter 203 may utilize a sensor using a shunt resistor, a clamp sensor, a Rogowski coil, and an optical current transformer sensor. Although the ammeter 203 is installed in series to the electrodes 303, 304 in general, when a high current is measured, the ammeter 203 may be installed so that a current is measured for each of circuits into which a current path is divided.

Similarly, the voltmeter 207 of FIG. 7 is the voltmeter 207 in the information acquisition device 2 (see FIG. 1). The voltmeter 207 may utilize a voltage probe or the like. Although the voltmeter 207 is installed in parallel to a welding electrode in general, in the case of a high voltage, the voltmeter 207 may be installed so that a voltage is measured for each of circuits in which a voltage is divided with multiple electric circuit elements (such as a resistor, a capacitor). Specifically, a voltage is measured for each of electric circuit elements, and the voltage between the electrode 303 and the electrode 304 may be given by the total of the voltage.

Subsequently, the switch 312 is connected by a user, and thus a current flows from the electrode 303 to the electrode 304 through the members 301, 302 to be welded. Thus, Joule heat is generated in the connection portion between the members 301, 302 to be welded, and a welded part 321 (see FIG. 8) in the members 301, 302 to be welded is welded.

FIG. 8 illustrates a member 331 to be welded (the component 5 to be welded) generated by such resistance welding.

Here, a problem in a conventional welding evaluation method will be described.

In such resistance welding, the contact surface between the member 301 to be welded and the member 302 to be welded is often large. When the contact surface, in which resistance welding is performed, is large, the welded part 321 is not uniformly welded unless a current flows through the members 301, 302 to be welded with a uniform contact surface. For this reason, edge preparation may be made on the members 301, 302 to be welded.

In addition, depending on the state of contact between the electrode 303, 304 (see FIG. 7) and the members 301, 302 to be welded, a difference in contact resistance occurs, and thus a current applied is not the same for each welding. Thus, the electrodes 303, 304 and the members 301, 302 to be welded are fixed by a retaining jig (not illustrated) so that the positional relationship between the members 301, 302 to be welded and the electrodes 303, 304 remains constant.

However, the members 301, 302 to be welded, and the state of edge preparation may vary case by case. Also, the electrodes 303, 304 wear according to usage conditions of the welding machine 4 (see FIG. 1), thus the welding conditions are changed. Furthermore, since the welding machine 4 illustrated in FIG. 1 includes various devices, many factors are involved in the change of the welding conditions. Thus, it is an object of the embodiment to stabilize and improve the quality by recognizing and managing the welding conditions for each welding.

(High-Speed Camera 202 and Spectral Camera 204)

Figure 9:
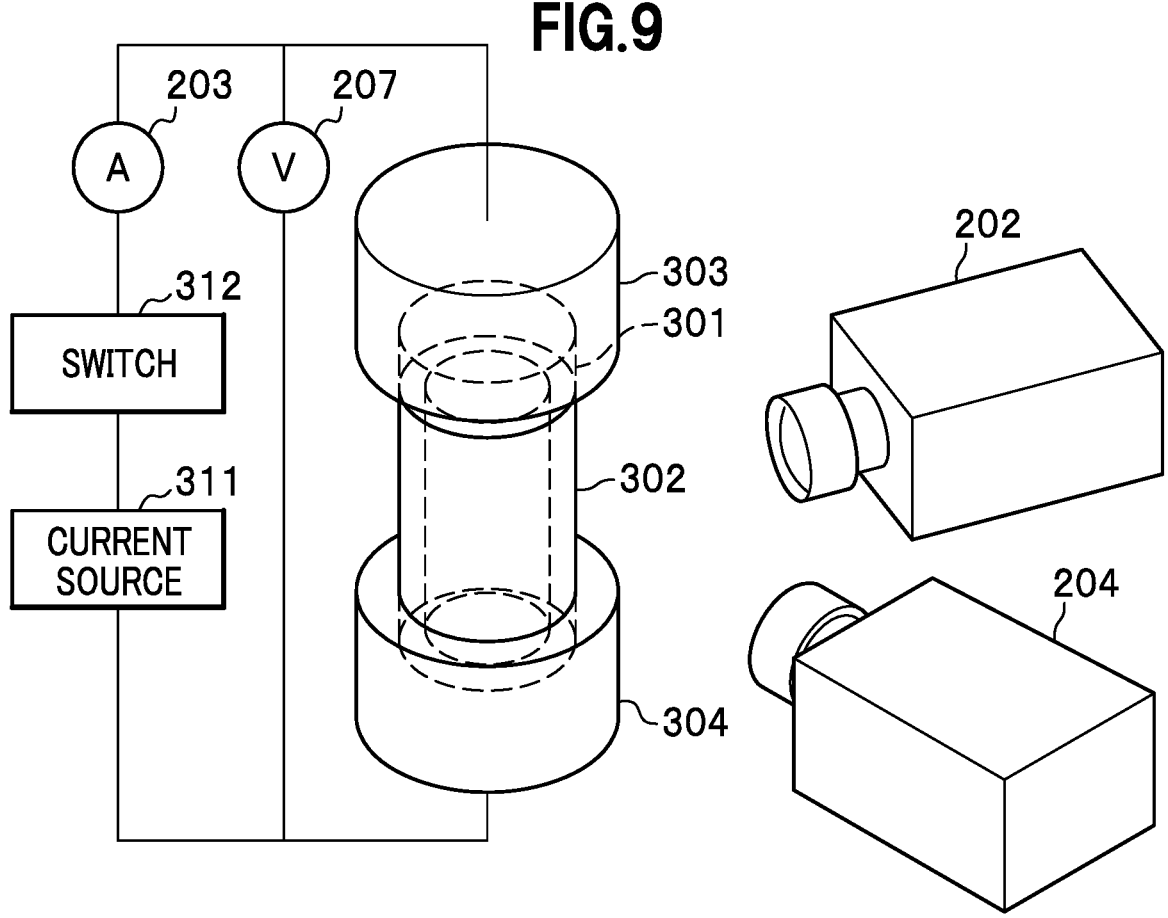
FIG. 9 is a view illustrating the manner in which a high-speed camera and a spectral camera are installed.

FIG. 9 is a view illustrating the manner in which the high-speed camera 202 and the spectral camera 204 are installed.

In FIG. 9, the members 301, 302 to be welded, the electrodes 303, 304, the current source 311, the switch 312, the ammeter 203, and the voltmeter 207 are the same as those in FIG. 7, thus a description here is omitted.

The high-speed camera 202 is installed in the welding machine 4 (see FIG. 1). The high-speed camera 202 is for monitoring the members 301, 302 to be welded (monitoring the welded part 321 (see FIG. 8)), and monitoring the light emission state of welding. As illustrated in FIG. 9, the spectral camera 204 is also installed in the welding machine 4 (see FIG. 1). The spectral camera 204 is for performing spectral analysis of the light which emits from the welded part 321 (see FIG. 8).

Although the high-speed camera 202 and the spectral camera 204 are each installed in FIG. 9, another set of the high-speed camera 202 and the spectral camera 204 may installed on the opposite side from the members 301, 302 to be welded so that the entire circumference of the welded part 321 can be captured.

It is sufficient that the component of the light which emits from the welded part 321 be inputted to the spectral camera 204. Thus, a mirror which is not illustrated may be installed in a circumferential direction of the members 301, 302 to be welded, and the light collected by the mirror may be captured. In this manner, it is possible for one spectral camera 204 to capture the entire circumference of the welded part 321. Similarly, it is also possible for one high-speed camera 202 to capture the entire circumference of the welded part 321 by installing a mirror which is not illustrated in a circumferential direction of the members 301, 302 to be welded.

(High-Speed Camera Image Analysis)

FIGS. 10 to 13 are each a view illustrating an example of an image captured by the high-speed camera 202 at the time of welding.

Figure 10:
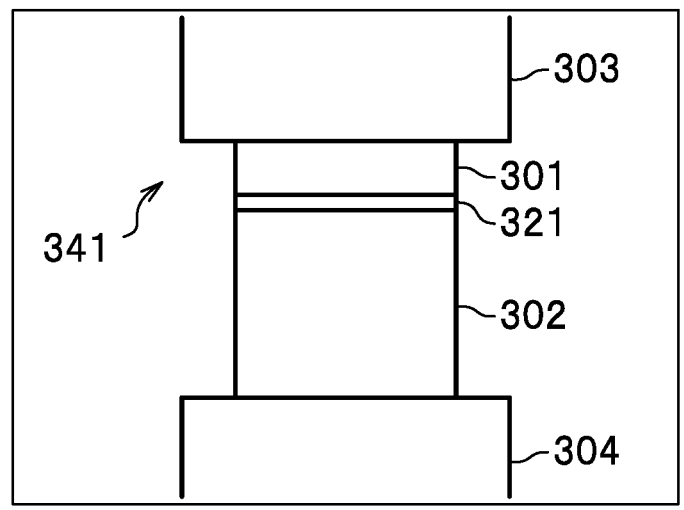
FIG. 10 is a view (part one) illustrating an example of an image captured by a high-speed camera.
Figure 11:
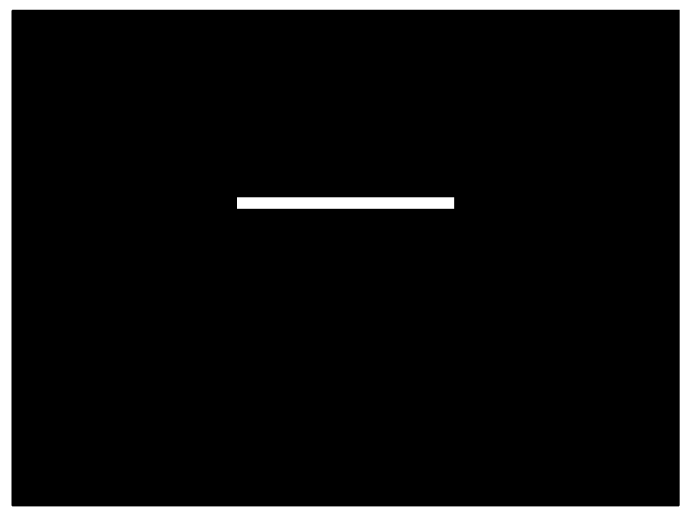
FIG. 11 is a view (part two) illustrating an example of an image captured by a high-speed camera.

FIG. 10 is a view illustrating a captured image of a welding work 341. Here, the welding work 341 is such that the electrodes 303, 304 are set in the stacked members 301, 302 to be welded in FIG. 6. When the high-speed camera 202 is used, the luminance is reduced and an image darkens. However, when a current is applied, as illustrated in FIG. 11, light emission (the white portion of FIG. 11) accompanying metal melting can be observed at the welded part 321 (see FIG. 8).

At this point, when a current is uniformly applied to the welded part 321, a light emission distribution is uniform. However, when foreign particles are present in the welded part 321 or a contact state is poor, the current does not flow uniformly.

Figure 12:
FIG. 12 is a view (part three) illustrating an example of an image captured by a high-speed camera.
Figure 13:
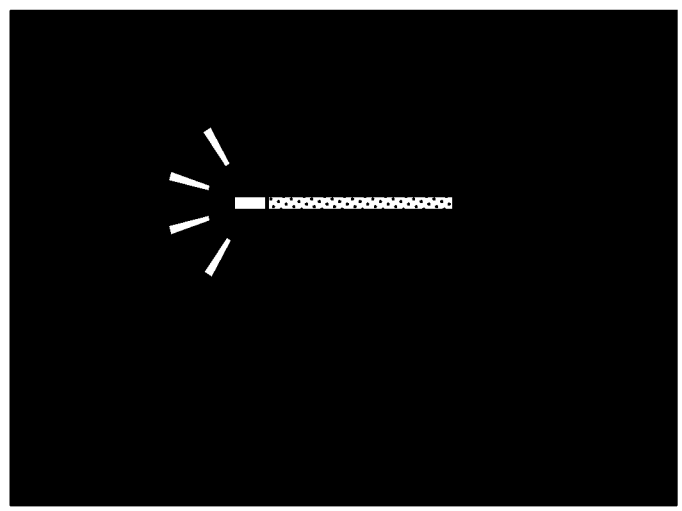
FIG. 13 is a view (part four) illustrating an example of an image captured by a high-speed camera.

FIGS. 12 and 13 are examples of an image when the current is probably not flowing uniformly at the welded part 321 (see FIG. 8).

In the image illustrated in FIG. 12, dot portions, and a white portion are present where light is emitted. The white portion indicates that it has higher light emission luminance than other light emission portions (the dot portions). In other words, the white portion has a higher temperature than other light emission portions (the dot portions). This occurs because the contact surface is not uniform at the members 301, 302 to be welded (see FIG. 5), and the current is deviated. When such welding is performed, the quality of welding deteriorates.

In the image illustrated in FIG. 13, a white fan-shaped portion indicates that sparks fly. The white portion indicates that it has higher light emission luminance (higher temperature) than other light emission portions (the dot portions).

That is, sparks are captured in the image illustrated in FIG. 13. This is probably because foreign particles are mixed into the contact surface between the members 301, 302 to be welded (see FIG. 5), and when a current is applied, sparks fly due to a sudden voltage surge. In this situation, the thermal energy to be originally consumed at the welded part is consumed by the sparks, thus the quality of welding deteriorates.

The variation of luminance illustrated in FIG. 12 and the sparks as illustrated in FIG. 13 indicate a difference in temperature at the welded part 321 (see FIG. 8). As described above, the white portion illustrated in FIGS. 12 and 13 has a higher temperature than other portions indicated by dots. In other words, the high-speed camera 202 measures a local temperature in the welded part 321.

In this manner, an image captured by the high-speed camera 202 enables to determine whether or not foreign particles are present in the welded part 321 and whether or not the welded part 321 is uniformly welded.

(Spectral Camera Image Analysis)

FIGS. 14A to 16 are graphs illustrating an example of spectral data (frequency distribution) and one-dimensional spectral data (frequency distribution) acquired by the spectral camera 204.

The spectral camera 204 may utilize a streak camera having a spectral function, and a high-speed camera and a hyper spectrum camera both having a spectral function.

Figure 14A:
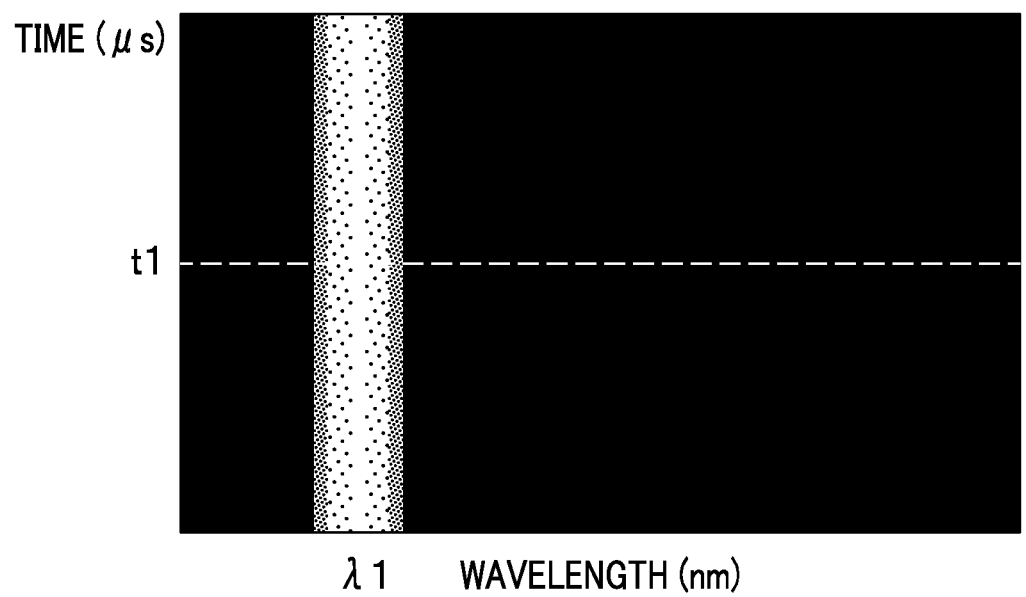
FIGS. 14A and 14B are graphs (part one) illustrating an example of spectral data and one-dimensional spectral data captured by a spectral camera.
Figure 14B:
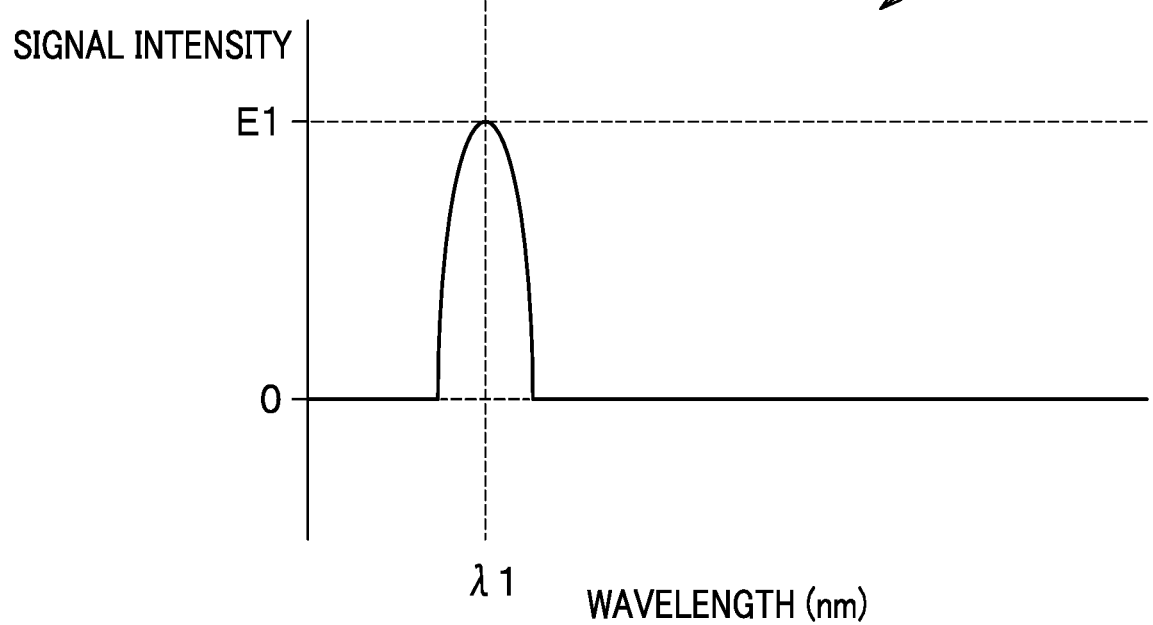

FIGS. 14A and 14B are each an explanatory graph of spectral data acquired by a streak camera having a spectral function used as the spectral camera 204. The streak camera is a device that records light for a certain period of time, the light being resolved into wavelength components using the spectral function of a spectroscope or the like.

As an example of spectral data acquired by a streak camera, FIGS. 14A and 14B illustrate a result when a laser beam is received.

FIG. 14A illustrates spectral data B240 acquired by the streak camera, the horizontal axis indicates wavelength (nm), and the vertical axis indicates time (μs). In FIG. 14A, black indicates a low value (zero) and white indicates a high value. In FIG. 14A, each dot indicates an intermediate value between a black portion and a white portion, a narrower interval between dots indicates a lower value.

It is known that a laser beam has substantially a single wavelength. Let λ1 (nm) be the wavelength of the laser beam in FIG. 14A, then a highest value (white) is present at the wavelength λ1 of FIG. 14A over the entire time period.

FIG. 14B illustrates one-dimensional spectrum data B244 in which only the data at a certain t1 is retrieved from the spectral data B240 illustrated in FIG. 14A.

In other words, FIG. 14B illustrates a distribution in wavelength characteristics at time t1 in FIG. 14A, and the horizontal axis indicates wavelength, and the vertical axis indicates signal intensity. Here, the signal takes a peak value E1 at the wavelength λ1 (nm).

In this manner, the spectral camera 204 makes it possible to obtain information on the spectral characteristics of measured light.

(At Normal Time)

Figure 15A:
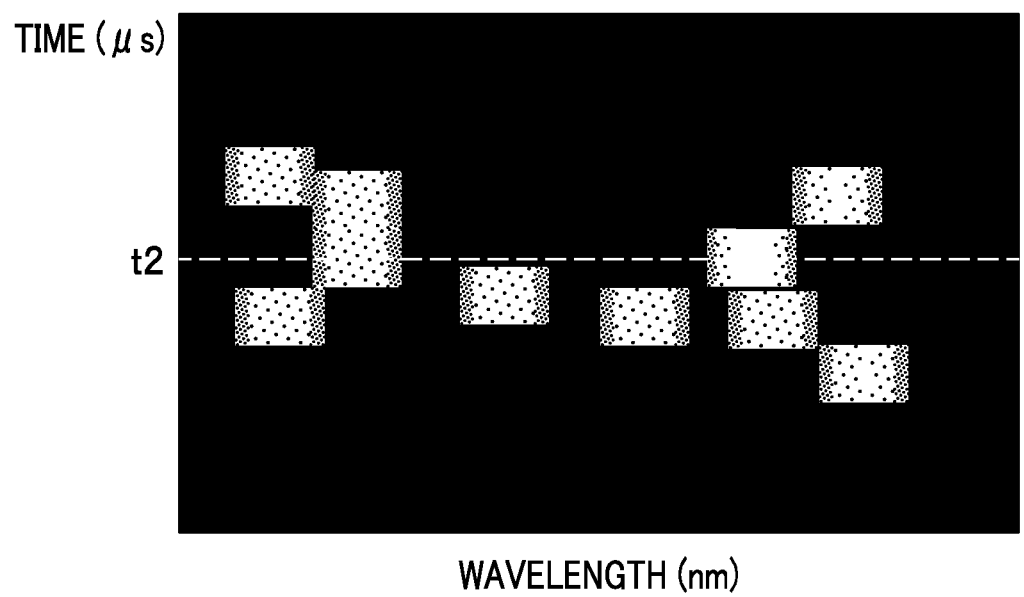
FIGS. 15A and 15B are graphs (part two) illustrating an example of spectral data and one-dimensional spectral data captured by a spectral camera.
Figure 15B:
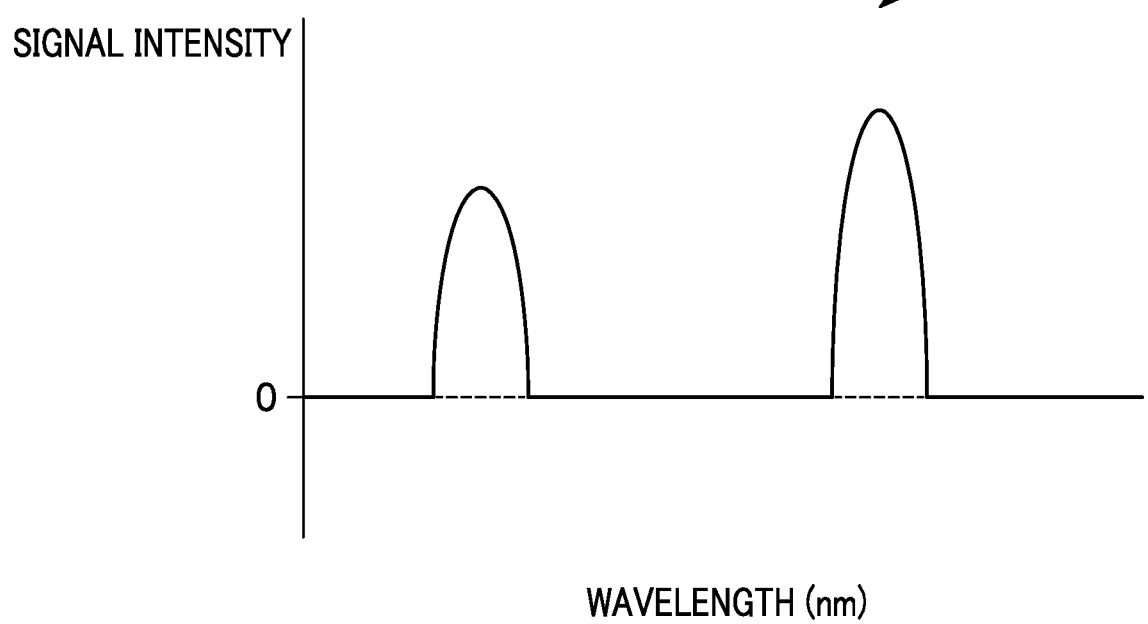

FIGS. 15A and 15B are graphs illustrating an example of a signal image acquired using a streak camera as the spectral camera 204 in a normal welding process.

FIG. 15A is spectral data B246 acquired from a streak camera, the horizontal axis indicates wavelength (nm), and the vertical axis indicates time (μs). Similarly to FIGS. 14A and 14B, black indicates a low value (zero), white indicates a high value, and each dot indicates an intermediate value. The intermediate value indicates a lower value for a narrower interval between dots.

FIG. 15B illustrates one-dimensional spectrum data B248 in which only the data at a certain t2 is retrieved from the spectral data B246.

As described in FIG. 11, in normal welding, the welded part 231 (see FIG. 8) tends to emit light uniformly. The manner in which light is emitted around time t2 can be seen from FIG. 15A. FIG. 15B illustrates multiple light emission wavelengths at time t2. The pattern of the spectral data B246 illustrated in FIG. 15A and the one-dimensional spectrum data B248 in FIG. 15B can be considered as the light emission characteristics pattern in normal welding.

(At Abnormal Time)

Figure 16A:
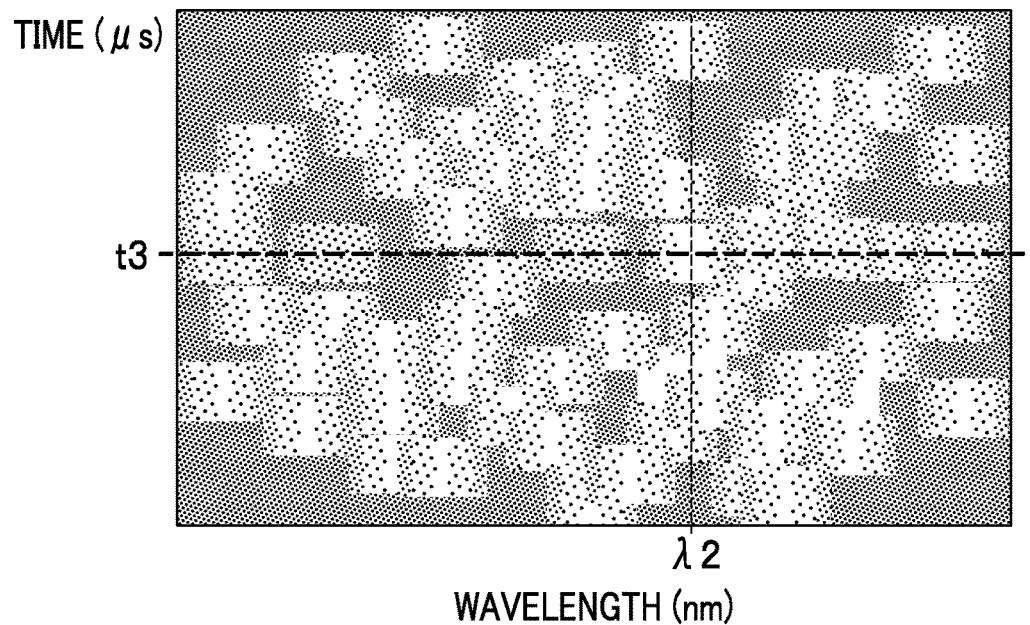
FIGS. 16A and 16B are graphs (part three) illustrating an example of spectral data and one-dimensional spectral data captured by a spectral camera.
Figure 16B:
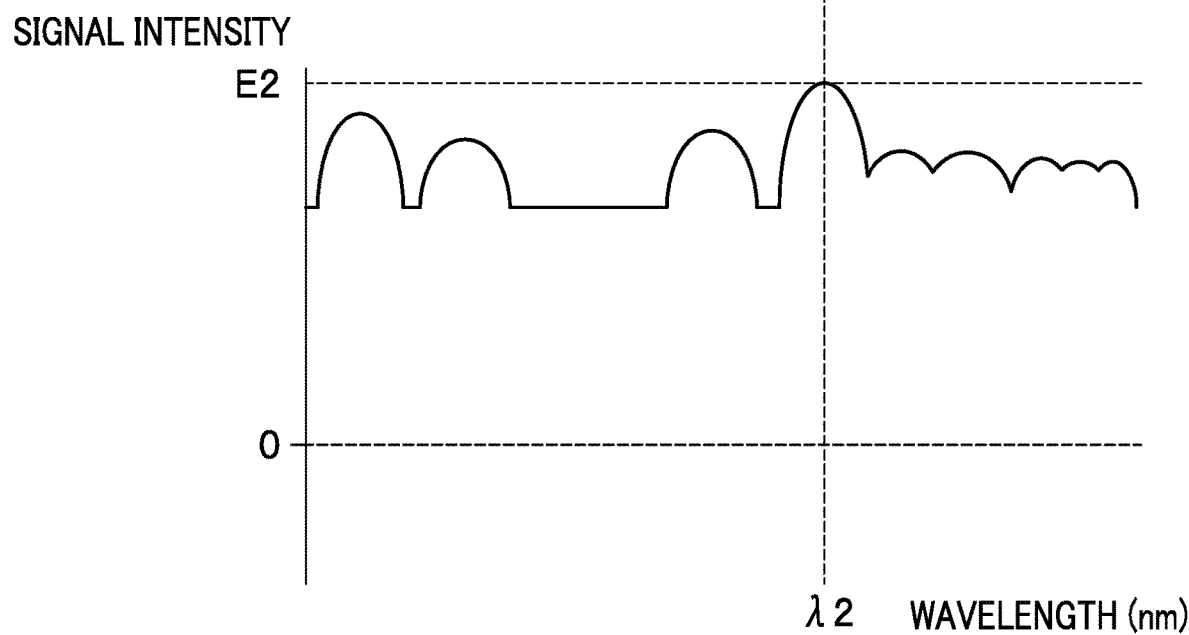

As the case where a current is not flowing uniformly at the welded part 321 (see FIG. 8), FIGS. 16A and 16B are each an example of signals acquired by a streak camera serving as the spectral camera 204 in a welding process (see FIG. 13) in which varied sparks fly for a distribution in light emission luminance.

FIG. 16A is spectral data B251 acquired by a streak camera, the vertical axis indicates time (μs), and the horizontal axis indicates wavelength (nm). Similarly to FIG. 14A, FIG. 15A, black indicates a low value (zero), white indicates a high value, and each dot indicates an intermediate value. A narrower interval between dots indicates a lower value.

FIG. 16B illustrates one-dimensional spectrum data B253 in which only the data at a certain t3 is retrieved from the spectral data B251 in FIG. 16A.

For a welding process in which sparks fly as illustrated in FIG. 13, as illustrated in FIGS. 16A and 16B, overall high signal intensity is observed for a long time at a wide wavelength, as compared with a normal welding process illustrated in FIGS. 15A and 15B. The time since sparks occur until the sparks disappear is varied, and there are various sparks having light emission times shorter or longer than the light emission time of the welded part 321. Among these, the sparks having a light emission time longer than the light emission time of the welded part 321 raise the level of the signal intensity in FIG. 16B. Also, for sparks with various temperatures, light emission wavelengths also include various components, thus responses in a wide wavelength range can be observed.

Furthermore, when sparks occur due to foreign particles, light emission characteristics change according to the type of foreign particles. For instance, change in the characteristics is caused by flame reaction of foreign metal particles. As a specific example, it is known that sodium can be identified by a wavelength near 589 nm (yellow). Foreign particles can be identified by utilizing this. In this case, foreign particles are identified by whether or not the peak of signal intensity occurs at the wavelength according to flame reaction. When the wavelength λ2 at the peak of signal intensity in FIG. 16B is 589 nm, it is conjectured that foreign particles originating from sodium are mixed.

Like this, spectral data acquired by the spectral camera 204 provides information such as the temperature of a light emission portion, whether or not foreign particles are mixed, and the type of foreign particles. In addition, temperature information can also be obtained by spectral data from the spectral camera 204.

(Current and Voltage Information Analysis)

Figure 17:
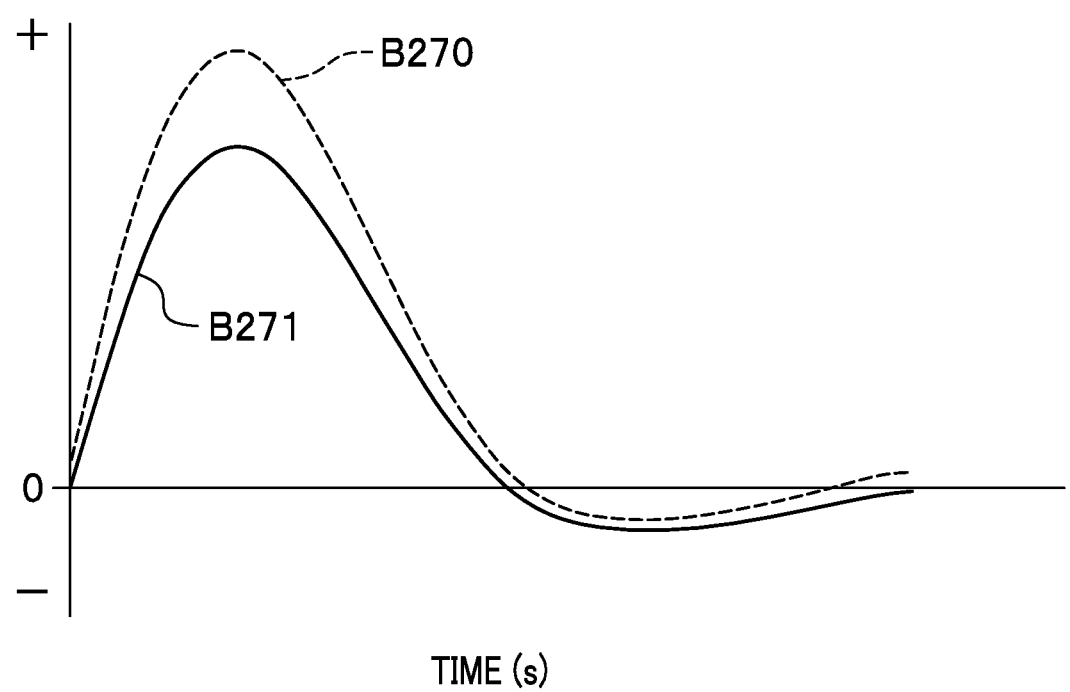
FIG. 17 is a graph (part one) illustrating an example of a current waveform and a voltage waveform in current application at the time of welding.

FIG. 17 is a graph illustrating an example of a voltage waveform B270 and a current waveform B271 in current application at the time of welding.

In other words, the waveforms illustrated in FIG. 17 illustrate a temporal variation in the current and voltage measured by the ammeter 203 and the voltmeter 207 (see FIG. 7). In FIG. 17, the horizontal axis indicates time (s), and the vertical axis indicates current value and voltage value.

As illustrated in FIG. 17, Joule heat is generated in the members 301, 302 to be welded by suddenly applying a current to the members 301, 302 to be welded (see FIG. 5). The welded part 321 (see FIG. 8) of the members 301, 302 to be welded is melted by the Joule heat. The Joule heat is reduced (cooled) by blocking or reducing the current. This allows the melted part to be cooled and solidified, thus welding is completed. Incidentally, the waveform illustrated in FIG. 17 illustrates an example of the voltage waveform B270 and the current waveform B271 when a capacitor type resistance welding device is used as the welding machine 4. The capacitor type resistance welding device uses the electrical energy charged in the capacitor (not illustrated) as the current source 311 (see FIG. 7).

When the switch 312 (see FIG. 7) is set to ON, the voltage is raised rapidly as indicated by the voltage waveform B270 (dashed line). Accordingly, the current is also raised rapidly as indicated by the current waveform B271 (solid line). Thus, the current source 311 set in advance, in other words, in a capacitor type resistance welding device, a current according to the charge voltage in the capacitor is applied to the members 301, 302 to be welded, and welding is performed. Current application includes a method of applying a current once, in other words, achieving a current peak once as in this example, and a method of applying a current twice or more, in other words, achieving a current peak multiple times. These methods are different only in the current application condition, which does not limit the technique in the embodiment.

Next, the output waveforms of the ammeter 203 and the voltmeter 207 in the case of normal welding and welding in which sparks fly will be described with reference to FIGS. 18A, 18B, 19A and 19B.

Figure 18A:
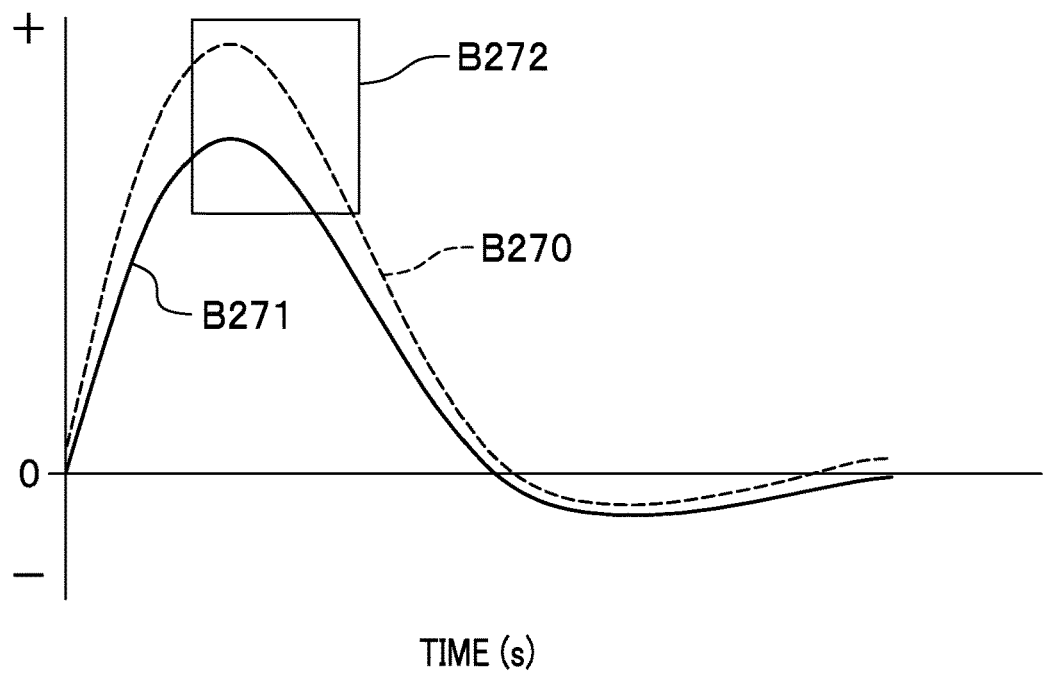
FIGS. 18A and 18B are graphs (part two) illustrating an example of a current waveform and a voltage waveform in current application at the time of welding.
Figure 18B:
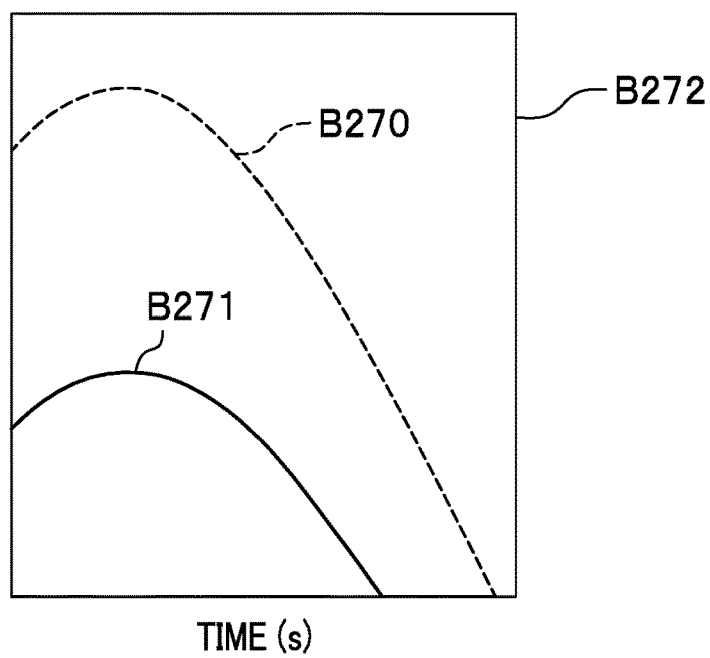

FIGS. 18A and 18B are graphs illustrating the output waveforms of the ammeter 203 and the voltmeter 207 (see FIG. 7) in the case of normal welding.

FIG. 18A illustrates the voltage waveform B270 (dashed line) and the current waveform B271 (solid line) from application of a current till attenuation. FIG. 18B is an enlarged view of an area B272 near the peak value in FIG. 18A.

Figure 19A:
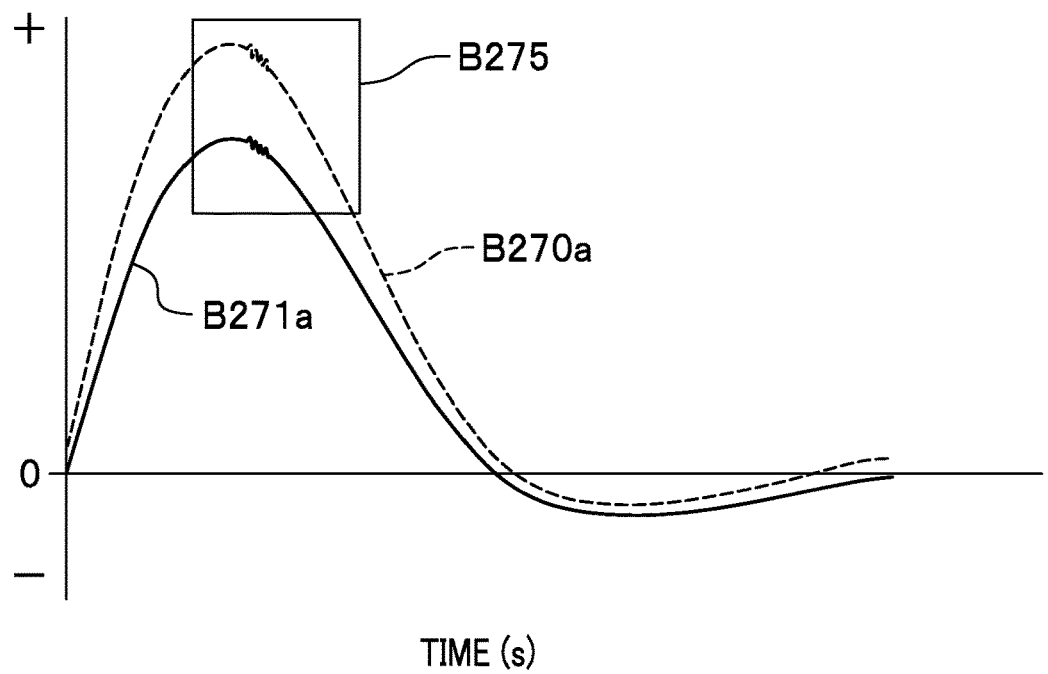
FIGS. 19A and 19B are graphs (part three) illustrating an example of a current waveform and a voltage waveform in current application at the time of welding.
Figure 19B:
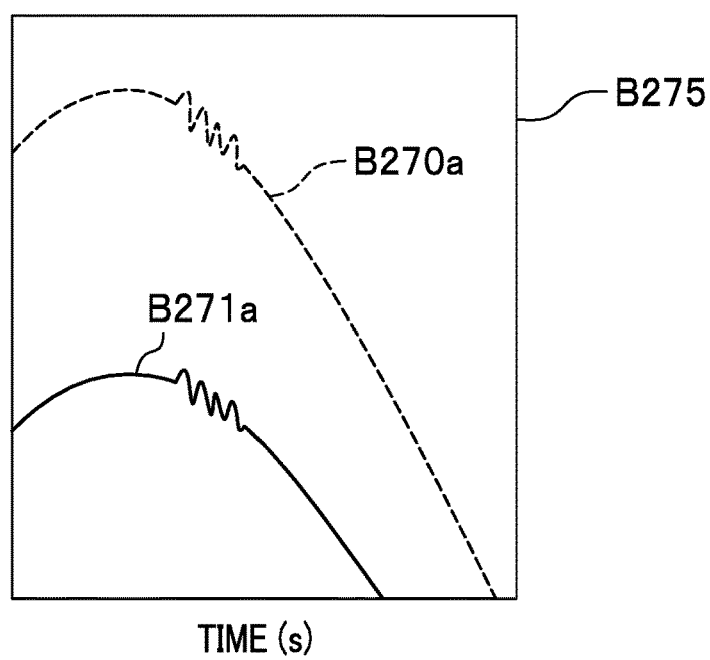

FIGS. 19A and 19B are graphs illustrating the output waveforms of the ammeter 203 and the voltmeter 207 (see FIG. 7) in the case where sparks fly in the process of welding. FIG. 19A illustrates a voltage waveform B270a (dashed line) and a current waveform B271a (solid line). FIG. 19B is an enlarged view of an area B275 near the peak value in FIG. 19A.

When sparks fly in the process of welding, as illustrated in FIG. 19B, a high frequency component is superimposed on the voltage waveform B270a, and the current waveform B271a according to the timing of spark generation. When welding is normal as illustrated in FIG. 18B, such a high frequency component is not superimposed.

In this manner, the welding conditions can be recognized in detail by obtaining a temporal variation in the voltage waveform B270a, and the current waveform B271a obtained using the ammeter 203 and the voltmeter 207 at the time of welding. It goes without saying that it is possible to recognize the difference from predetermined welding conditions by observing the amplitudes of the current value, and the voltage value. Specifically, the voltage waveform B270a, and the current waveform B271a obtained from the ammeter 203 and the voltmeter 207 are compared with previously obtained current waveform, and voltage waveform at the normal time, thereby making it possible to determine welding abnormality.

The analysis illustrated in FIGS. 17 to 19A and 19B using the ammeter 203 and the voltmeter 207 is generally performed.

However, it is difficult to acquire information on distribution of light emission and heat generation in the welded part 321 (see FIG. 8) by the ammeter 203 and the voltmeter 207. This is because it is difficult to acquire integrated information on overall phenomenon of the members 301, 302 to be welded by the ammeter 203 and the voltmeter 207.

In order to observe deviation of current due to non-uniformity of the welded part 321, measurement by the ammeter 203 and the voltmeter 207 is not suitable.

Thus, in the embodiment, in order to acquire local information on the current distribution in the welded part 321, not only the data acquired by the above-described high-speed camera 202 and spectral camera 204 is used, but also the magnetic field measuring device 205 is introduced, which measures the magnetic field around the welded part 321. In the embodiment, the analysis illustrated in FIGS. 17 to 19A and 19B using the ammeter 203 and the voltmeter 207 is performed for overall evaluation.

(Magnetic Field Measuring Device Analysis)

The magnetic field measuring device 205 will be described using FIGS. 20A and 20B to 28.

Figure 20A:
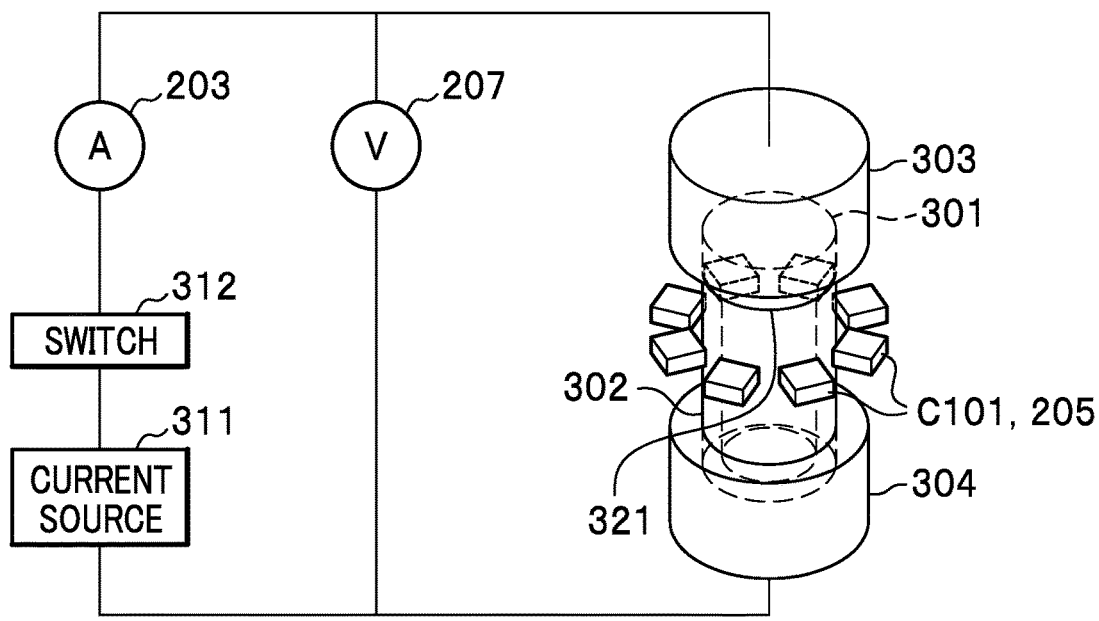
FIGS. 20A and 20B are explanatory diagrams related to a magnetic sensor.
Figure 20B:
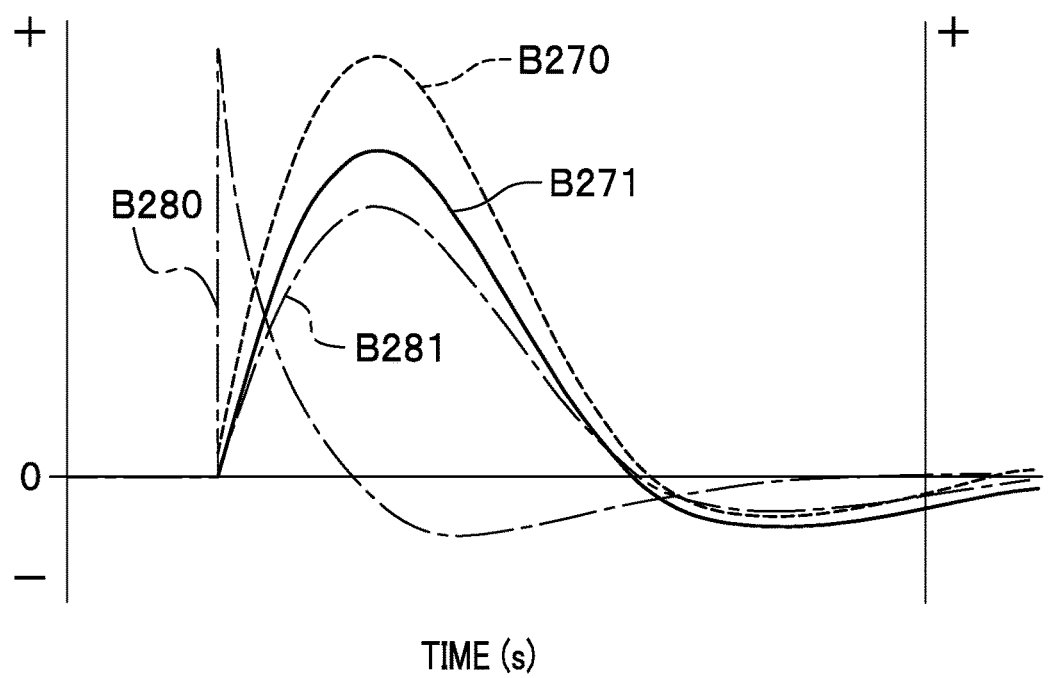

FIG. 20A is a diagram illustrating an example of installation of magnetic sensors C101 according to the embodiment, and FIG. 20B is a graph illustrating output waveforms of the magnetic sensors C101.

Figure 21A:
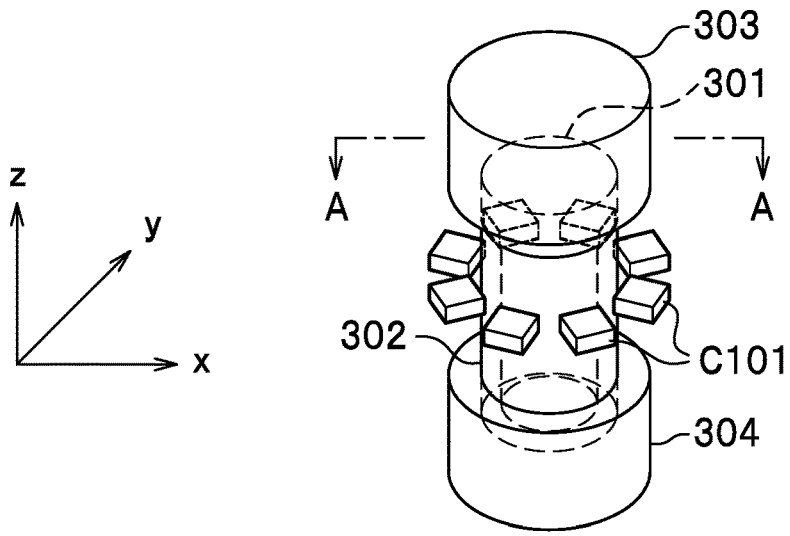
FIGS. 21A to 21C are views illustrating the details of arrangement of the magnetic sensors.
Figure 21B:
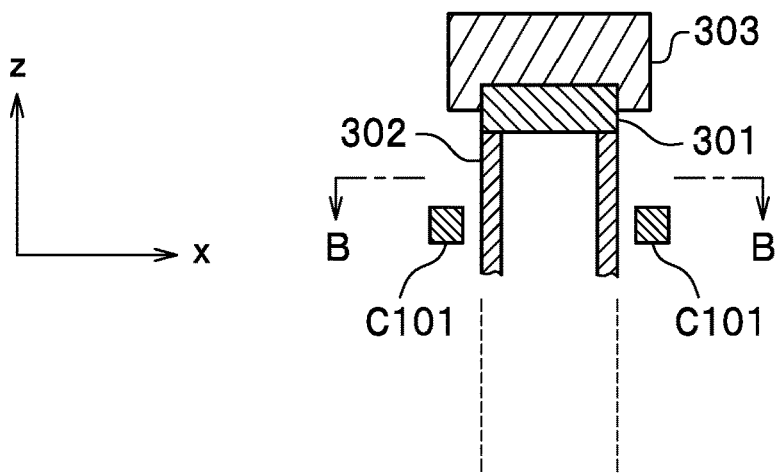
Figure 21C:
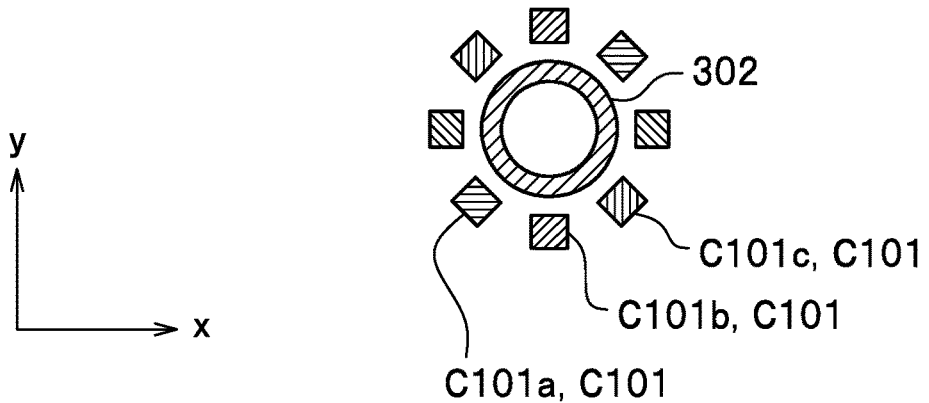

FIGS. 21A to 21C are views illustrating the details of arrangement of the magnetic sensors C101. FIG. 21A is an arrangement perspective view illustrating the arrangement of the magnetic sensors C101, FIG. 21B is a cross-sectional view taken along A-A of FIG. 21A, and FIG. 21C is a view as seen from B-B direction of FIG. 21B.

First, the arrangement of the magnetic sensors C101 in the magnetic field measuring device 205 will be described with reference to FIGS. 20A and 21A to 21C.

In FIG. 20A, the members 301, 302 to be welded, the electrodes 303, 304, the welded part 321, the current source 311, the switch 312, the ammeter 203, and the voltmeter 207 are the same as those in FIG. 7, thus a description here is omitted.

As illustrated in FIGS. 20A, 21A, and 21C, the magnetic sensors C101 are disposed around the welded part 321. In order to avoid interference with image capture by the high-speed camera 202 and the spectral camera 204, it is preferable to install the magnetic sensors C101 with vertically shifted from the welded part 321. Even when the magnetic sensors C101 are vertically shifted from the welded part 321, it is possible to measure the local magnetic field in the welded part 321.

The magnetic sensor C101 may utilize a coil, a hole sensor, a magnetic resistance element, a magneto optical sensor, and the like.

Magnetic sensors C101a to C101c in FIG. 21C will be described later.

FIG. 20B illustrates an example of output waveforms of the ammeter 203, the voltmeter 207, and the magnetic sensors C101.

In FIG. 20B, the horizontal axis indicates time (s), the vertical axis on the left side of the paper surface indicates current value and voltage value, and the vertical axis on the right side of the paper surface indicates magnetic flux density (G).

Symbol B270 indicates the voltage waveform measured by the voltmeter 207, and symbol B271 indicates the current waveform measured by the ammeter 203. When each magnetic sensor C101 is a hole sensor, a magnetic resistance element, or a magneto optical sensor, symbol B281 indicates a coil output waveform (magnetic flux density waveform) acquired from the magnetic sensor C101. Furthermore, symbol B280 indicates a magnetic field waveform (magnetic flux density waveform) when the magnetic sensor C101 is a coil sensor.

The coil output waveform B280 measures the waveform obtained by time-differentiating the magnetic field waveform B281 (Faraday's law of electromagnetic induction). In contrast, the magnetic sensors C101 (for instance, a hole sensor, a magnetic resistance element, and a magneto optical sensor) other than the coil sensor measures a magnetic field intensity (magnetic flux density) itself. In other words, when a coil sensor is used as the magnetic sensor C101, the output waveform is the coil output waveform B280, and when a magnetic sensors other than the coil sensor is used as the magnetic sensor C101, the output waveform is the magnetic field waveform B281.

For instance, even when the magnetic sensors C101 include only coil sensors, the magnetic field waveform B281 can be acquired by time-differentiating the coil output waveform obtained. Conversely, even when the magnetic sensors C101 include only hole sensors, magnetic resistance elements, and magneto optical sensors, the coil output waveform B280 can be acquired by time-differentiating the magnetic field waveform B281 obtained.

Figure 22:
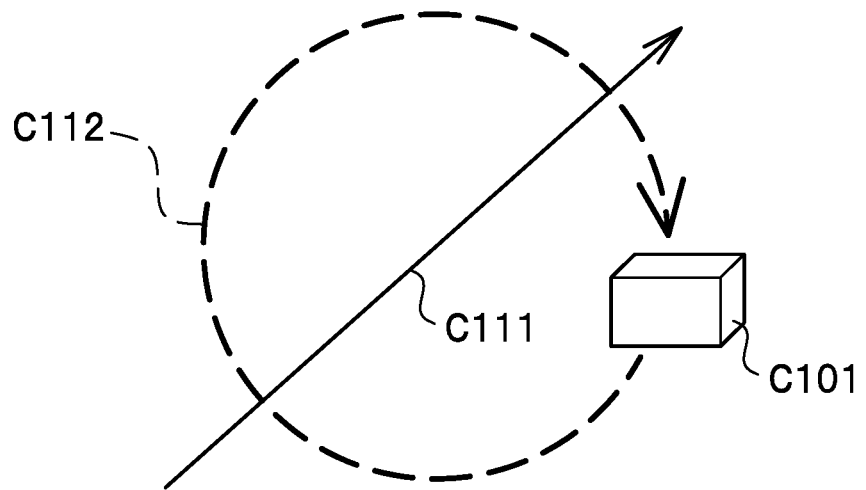
FIG. 22 is an illustration for explaining a relationship between output of the magnetic sensors and current path.

FIG. 22 is an illustration for explaining a relationship between the output of each magnetic sensors C101 and a current path C111.

Current measurement by the magnetic sensor C101 measures a magnetic field generated by a current. In a space where a current exists, a magnetic field C112 is generated in a direction perpendicular to the current path C111 in accordance with the right-handed screw rule. The magnetic sensor C101 is installed in the magnetic field C112 to measure a current indirectly.

Figure 23A:
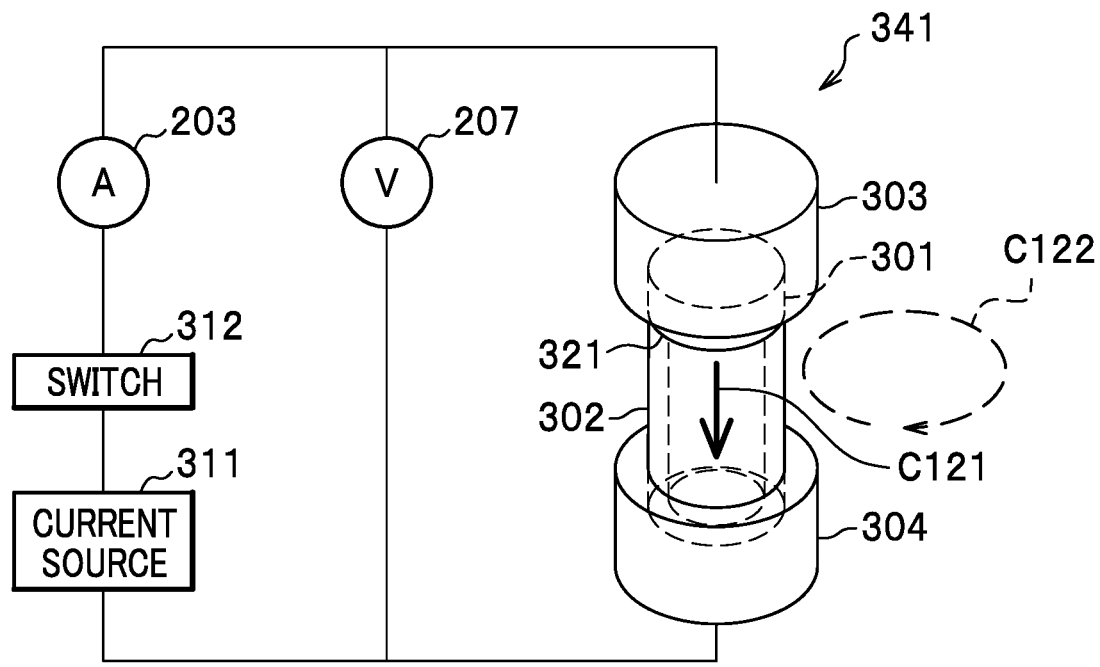
FIGS. 23A and 23B are views schematically illustrating a magnetic field generated around a welding work.
Figure 23B:
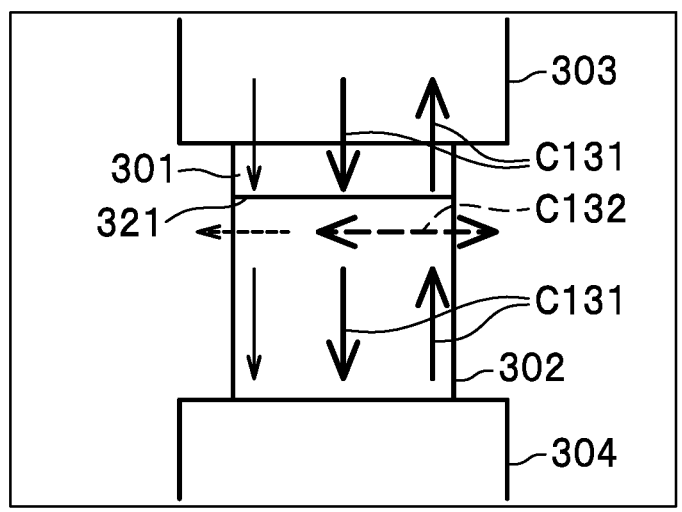

FIGS. 23A and 23B are views schematically illustrating a magnetic field generated around the welding work 341 at the time of welding. FIG. 23A is a view for explaining a current and a magnetic field flowing through the entire welding work, and FIG. 23B is a view illustrating the direction of a local current, and the direction of a magnetic field.

In FIGS. 23A and 23B, the members 301, 302 to be welded, the electrodes 303, 304, the welded part 321, the current source 311, the switch 312, the ammeter 203, and the voltmeter 207 are the same as those in FIG. 7, thus a description here is omitted.

As illustrated in FIG. 23A, a current C121, which flows through the welding work 341, mainly flows between the electrode 303, 304, thus a magnetic field C122 is generated around the welding work 341. However, when attention is focused on the local current in the welded part 321, when the current is not flowing uniformly in the welded part 321, in other words, when a current amount or a current path locally changes, the magnitude and the direction of the magnetic field near the welded part 321 also vary. In the embodiment, as illustrated in FIGS. 20A and 20B, a local current change in the welded part 321 is measured by disposing the magnetic sensors C101 around the welded part 321.

In FIG. 23B, the direction of local current in the welded part 321 is represented by a solid line arrow C131, the direction of magnetic field is represented by a dashed line arrow C132, and these magnitudes (the current amount, the magnetic field intensity) are indicated in terms of the thickness of each arrow. As illustrated in FIG. 23B, the magnetic field intensity increases or decreases according to increase or decrease in the current amount, and when the direction of current changes locally, the direction of magnetic field also changes. It is difficult to observe such a phenomenon by measuring a current flowing through the entire members 301, 302 to be welded using the ammeter 203. In the embodiment, the local currents as illustrated in FIG. 23B are to be evaluated by disposing multiple magnetic sensors C101 around the welded part 321.

FIGS. 24 to 28 are graphs each illustrating an example of evaluation of a current using the magnetic field measuring device 205 illustrated in FIG. 20A and FIGS. 21A to 21C.

Here, in each of FIGS. 24 to 28, the horizontal axis indicates time (s).

FIG. 24 is the magnetic field waveform at the normal time, that is, when the current is flowing uniformly in the welded part 321 (see FIG. 8).

In the top row of FIG. 24, the waveforms (the voltage waveform B270 (dashed line), the current waveform B271 (solid line)) of the ammeter 203, and the voltmeter 207 are illustrated. In the lower three rows of FIG. 24, magnetic field waveforms B282a to B282c measured by three magnetic sensors C101 are illustrated. Here, the magnetic field waveforms B282a to B282c correspond to the magnetic field waveforms acquired from the magnetic sensors C101a to C101c in FIG. 21C.

Also, the forms of the voltage waveform B270, the current wave form B271 correspond to the sum of the magnetic field waveforms B282a to B282c.

Here, although each magnetic sensor C101 uses a coil, the magnetic field waveforms B282a to B282c use the integral of the output waveform from the coil.

As illustrated in FIG. 24, when welding is normal, the peak times and peak value B1 of the magnetic field waveforms B282a to B282c are identical.

Also, a dashed line B2 indicates the rise time of each waveform when welding is normal. In other words, the dashed line B2 indicates the time at which the current started to flow from the current source 311 (see FIG. 9). Also, a dashed line B3 indicates the peak time of each waveform when welding is normal.

In the subsequent FIGS. 25 to 27, the peak value B1 indicates the common value with FIG. 24. Furthermore, in the subsequent FIGS. 25 to 28, the rise time B2, and the peak time B3 indicate the common values with FIG. 24.

FIGS. 25 and 26 are magnetic field waveforms B283a to B283c, B284a to B284c when the current is not flowing uniformly in the welded part 321.

In the top row of FIG. 25, the waveforms (the voltage waveform B270 (dashed line), the current waveform B271 (solid line)) of the ammeter 203, and the voltmeter 207 are illustrated. In the lower three rows of FIG. 25, magnetic field waveforms B283a to B283c measured by three magnetic sensors C101 are illustrated. Here, the magnetic field waveforms B283a to B283c correspond to the magnetic field waveforms acquired from the magnetic sensors C101a to C101c in FIGS. 21A to 21C.

Also, the forms of the voltage waveform B270, the current wave form B271 correspond to the sum of the magnetic field waveforms B283a to B283c.

Here, although each magnetic sensor C101 uses a coil, the magnetic field waveforms B283a to B283c use the integral of the coil output waveform.

In the example illustrated in FIG. 25, the amplitudes (peak values of magnetic flux density) of the magnetic field waveforms B283a to B283c are different, as compared with the peak value B1 with a uniform current illustrated in FIG. 24. As described above, the amplitudes of the magnetic field waveforms B283a to B283c are proportional to the amount of current, thus as illustrated in FIG. 25, increase and decrease in the current in the vicinity of the magnetic sensor C101 can be evaluated by the change in the amplitude of the magnetic field waveforms B283a to B283c. That is, in the magnetic field waveforms B283a to B283c as in FIG. 25, it can be seen that there is a variation in the local current which flows through the welded part 231. When the current amount is small (when the amplitude of magnetic field waveform is small), heat energy necessary for welding is insufficient, and welding defects may occur.

In the top row of FIG. 26, the waveforms (the voltage waveform B270 (dashed line), the current waveform B271 (solid line)) of the ammeter 203, and the voltmeter 207 are illustrated. In the lower three rows of FIG. 26, magnetic field waveforms B284a to B284c measured by three magnetic sensors C101 are illustrated. Here, the magnetic field waveforms B284a to B284c correspond to the magnetic field waveforms acquired from the magnetic sensors C101a to C101c in FIG. 21C.

Also, the forms of the voltage waveform B270, the current wave form B271 correspond to the sum of the magnetic field waveforms B284a to B284c.

Here, although each magnetic sensor C101 uses a coil, the magnetic field waveforms B284a to B284c use the integral of the output waveform of the coil.

In the example illustrated in FIG. 26, the peak times and the peak values of the magnetic field waveforms B284a to B284c are different, as compared with peak time B3 and peak value B1 when the current is uniform illustrated in FIG. 24.

Particularly when attention is focused on the peak time, in the magnetic field waveform B284a, peak time B11 is later than the peak time B3. In the magnetic field waveform B284b, the peak time is the same as the peak time B3. In the magnetic field waveform B284c, peak time B12 is earlier than the peak time B3.

Therefore, it can be seen that the times at which a peak is achieved are in the following order: the magnetic field waveform B284c→the magnetic field waveform B284b→the magnetic field waveform B284a.

Thus, it is possible to grasp the manner in which a current for welding starts to flow at a local position of the member, and the current flow spreads over the entire welded part 321.

Specifically, in FIG. 26, the magnetic field waveform B284c has reached a peak first, and welding probably starts from the vicinity of the magnetic sensor C101 which has acquired the magnetic field waveform B284c. Similarly, it can be seen that the peak of each magnetic field waveform makes transition in welding: the magnetic field waveform B284c→the magnetic field waveform B284b→the magnetic field waveform B284a. Like this, the peaks of the magnetic field waveforms B284a to B284c each correspond to a time at which the current reaches the welded part, and thus it is possible to evaluate how the welded part 321 has melted in a temporal process.

In other words, from the example illustrated in FIG. 26, it can be seen that a difference in welding start time has occurred between corresponding portions of the welded part 321 due to a variation in the amount of welding.

FIG. 27 illustrates magnetic field waveforms B285a to B285c when sparks have occurred.

In the top row of FIG. 27, the waveforms (the voltage waveform B270a (dashed line), the current waveform B271a (solid line)) of the ammeter 203, and the voltmeter 207 are illustrated. In the lower three rows of FIG. 27, magnetic field waveforms B285a to B285c measured by three magnetic sensors C101 are illustrated. Here, the magnetic field waveforms B285a to B285c correspond to the magnetic field waveforms acquired from the magnetic sensors C101a to C101c in FIGS. 21A to 21C.

Also, the forms of the voltage waveform B270a, the current wave form B271a correspond to the sum of the magnetic field waveforms B285a to B285c.

Here, although each magnetic sensor C101 uses a coil, the magnetic field waveforms B285a to B285c use the integral of the output waveform of the coil.

As described in FIGS. 19A and 19B, when sparks occur, a high frequency component is superimposed on the voltage waveform B270a and the current waveform B271a (see symbol D101 in FIG. 27). Since the magnetic field is also proportional to the current, a high frequency component is also superimposed on the magnetic field waveforms B285a to B285c (see symbols D102 to D104). Incidentally, respective peak values of the magnetic field waveforms B285a to B285c in FIG. 27 are identical to B1 of the magnetic field waveforms B282a to B282c in FIG. 24.

In the example of FIG. 27, the amplitude of a high frequency component is increased in the magnetic field waveform 285b, thus it is possible to evaluate that sparks have occurred in the vicinity of the magnetic sensor C101 which has acquired the waveform.

Figure 28:
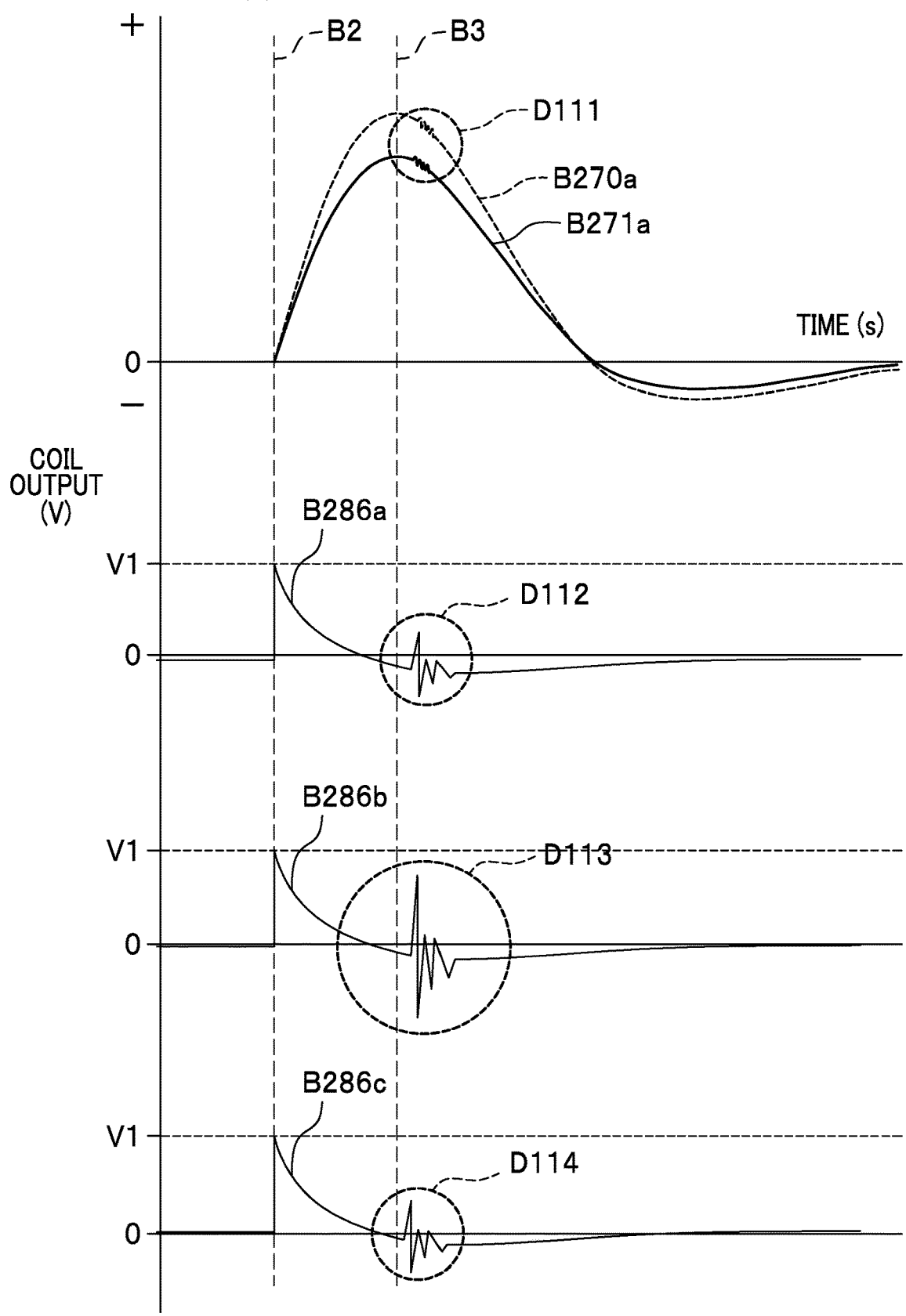
FIG. 28 is a graph illustrating an example of a coil output waveform.

Also, coil output waveforms B286a to B286c illustrated in FIG. 28 indicate the coil output waveforms B286a to B286c when sparks occur, in short, the time differential values of the magnetic field waveforms.

In the top row of FIG. 28, the waveforms (the voltage waveform B270a (dashed line), the current waveform B271a (solid line)) of the ammeter 203, and the voltmeter 207 are illustrated. In the lower three rows of FIG. 28, coil output waveforms B286a to B286c measured by three magnetic sensors C101 are illustrated. Here, the coil output waveforms B286a to B286c correspond to the magnetic field waveforms acquired from the magnetic sensors C101a to C101c in FIG. 21C.

As indicated by symbol D111, a high frequency component originating from sparks is superimposed on the voltage waveform B270 and the current waveform B271.

The coil output waveforms B286a to B286c of FIG. 28 correspond to the time differentials of the magnetic field waveforms B285a to B285c of FIG. 27, and the high frequency components in the magnetic field waveforms B285a to B285c of FIG. 27 are enhanced (see symbols D112 to D114). Incidentally, all the peak values of the coil output waveforms B286a to B286c are V1.

Therefore, in the coil output waveforms B286a to B286c, high frequency components having a larger amplitude are obtained at the time when sparks have occurred, as compared with the voltage waveform B270a, the current waveform B271a, and the coil output waveforms B286a to B286c illustrated in FIG. 27. In this manner, a spark occurrence position can be evaluated based on the occurrence of sparks and comparison of the magnitudes of amplitudes between the magnetic sensors C101.

It is to be noted that although a tiny difference has actually occurred between the voltage waveforms B270, B270a and between the current waveforms B271, B271a in FIGS. 26 to 28, the difference is not a level recognizable by human eyes, and thus the same waveforms are illustrated in the drawings. In other words, abnormality, which is unable to be caught by the ammeter 203 and the voltmeter 207, can be detected by the local magnetic field waveforms B283a to B283c, B284a to B284c measured by the magnetic field measuring device 205.

(Displacement Meter Analysis)

Figure 29A:
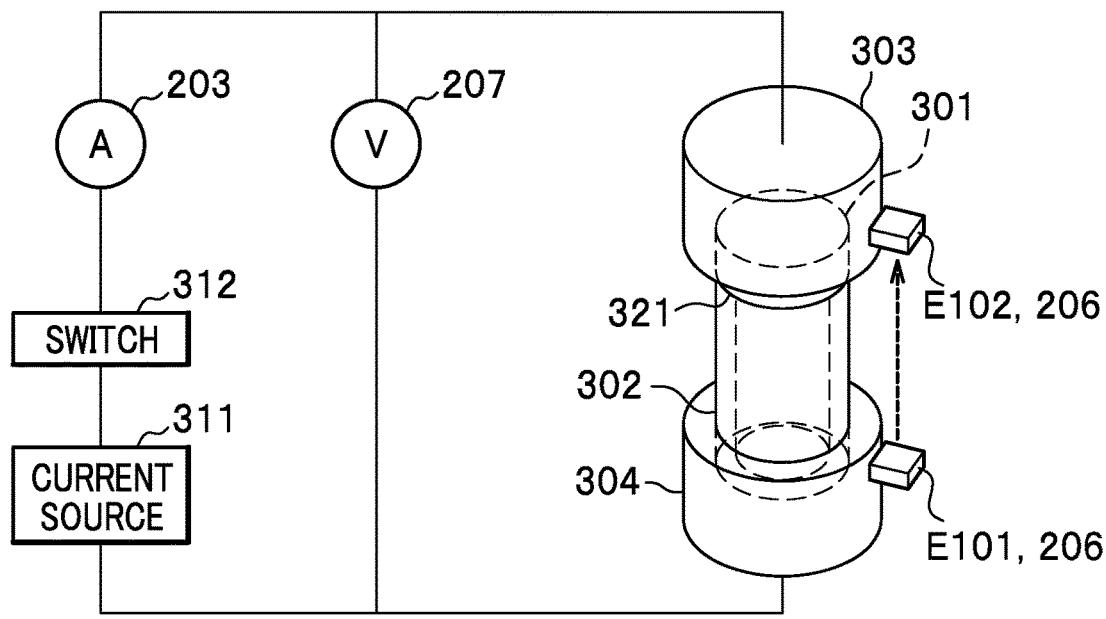
FIGS. 29A and 29B are diagrams for explaining an example of installation of a displacement meter, and an output result.
Figure 29B:
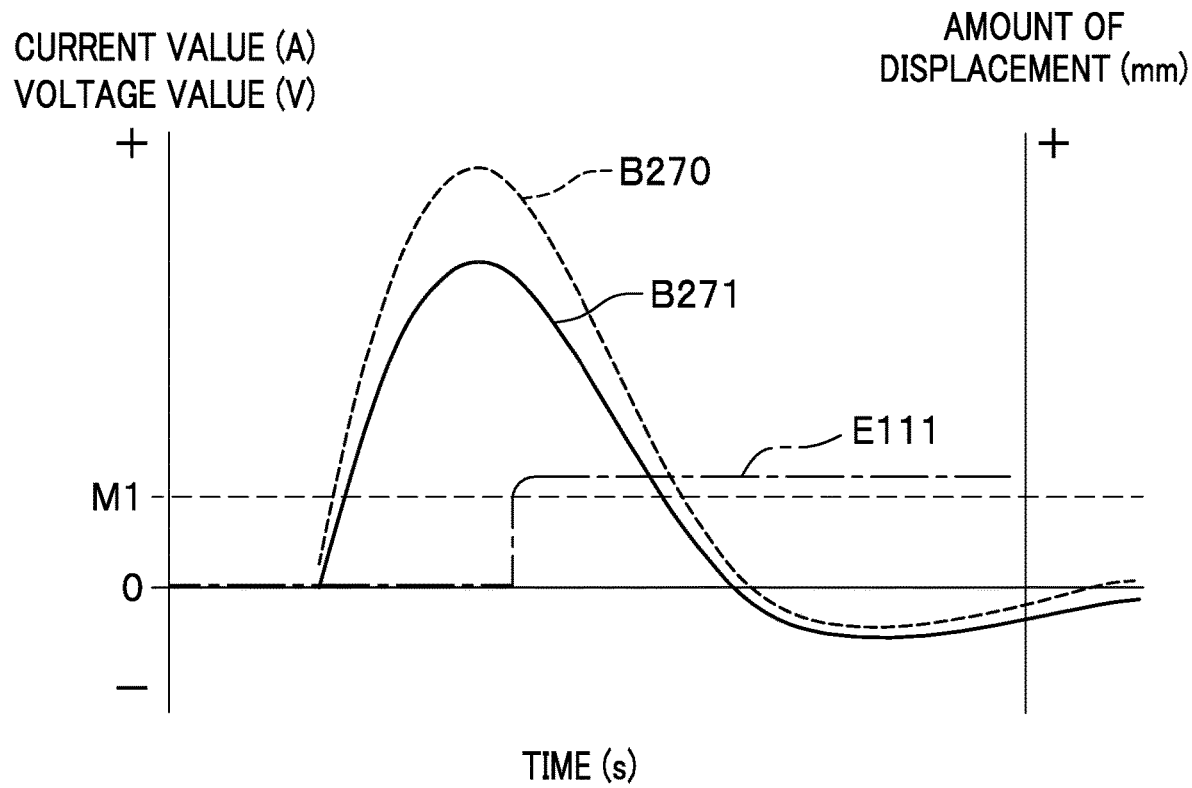

The analysis using the displacement meter 206 will be described with reference to FIGS. 29A and 29B. In FIGS. 29A and 29B, the members 301, 302 to be welded, the electrodes 303, 304, the welded part 321, the current source 311, the switch 312, the ammeter 203, and the voltmeter 207 are the same as those in FIG. 7, thus a description here is omitted.

FIGS. 29A and 29B are diagrams for explaining an example of installation of the displacement meter 206, and an output result. Here, FIG. 29A illustrates an example of installation of the displacement meter 206, and FIG. 29B is a graph illustrating a result of measurement by the displacement meter 206.

A laser displacement meter and a strain gauge may be used as the displacement meter 206. Alternatively, a method of converting a strain amount to a displacement may be used. In the embodiment, a case will be described where a laser displacement meter is used as the displacement meter 206.

As illustrated in FIG. 29A, in the displacement meter 206, a laser transmission device E101, a laser receiving device E102 are provided in the electrodes 303, 304, respectively.

Specifically, the distance between the electrode 303 and the electrode 304, in other words, the length of the members 301, 302 to be welded (the component 5 to be welded (see FIG. 1)) is measured by the laser transmission device E101, the laser receiving device E102.

When the distance between the electrode 303, 304 is reduced due to weld penetration, caused by welding, of the members 301, 302 to be welded, the degree of reduction is measured by the laser transmission device E101, the laser receiving device E102 which are each the displacement meter 206.

In this manner, the amount of displacement of the members 301, 302 to be welded when welding is performed can be monitored.

FIG. 29B is a graph illustrating the waveform of the amount of displacement.

In FIG. 29B, the horizontal axis indicates time (s), the vertical axis illustrated on the left side of the paper surface indicates current value and voltage value, and the vertical axis illustrated on the right side of the paper surface indicates the amount of displacement measured by the displacement meter 206.

Also, symbol B270 (dashed line) indicates a voltage waveform, and symbol B271 (solid line) indicates a current waveform. Then symbol E111 (dashed dotted line) indicates a temporal variation (displacement waveform) in the amount of displacement.

As timing, when the voltage waveform B270 and the current waveform B271 reach a peak value, displacement waveform E111 occurs. Incidentally, positive (+) direction for the amount of displacement is the direction in which the member is shrunk.

As described above, resistance welding is performed such that the members 301, 302 to be welded are melted by Joule heat generated by current application to the members 301, 302 to be welded, the members 301, 302 are pressed by the electrodes 303, 304, and thus joined. Thus, a current is applied, and when melting of the welded part 321 starts, the amount of displacement changes accordingly. At this point, when the amount of displacement is small, melted metal are not fused, and welding defects may occur. When the amount of displacement is excessive, melted metal is pushed out by a pressing force, welding defects may occur. Therefore, as illustrated in FIG. 29B, a predetermined threshold M1 is set, and when the amount of displacement is greater than or equal to the threshold M1, it can be determined that the metal is sufficiently melted, whereas when the amount of displacement is less than the threshold M1, it can be determined that the metal is not sufficiently melted. In such a situation, in the execution (step S4) of FIG. 3, an inspector sets processing parameters to increase the voltage used by the welding machine 4.

Here, the threshold M1 is set as the lower limit of the amount of displacement to detect insufficient melting. However, a threshold may be set as the upper limit of the amount of displacement to detect excessive melting. In such a situation, in the execution (step S4) of FIG. 3, an inspector sets processing parameters to decrease the voltage used by the welding machine 4.

In this manner, installment of the displacement meter 206 allows the value of displacement to be managed for each welding, and presence/absence of welding defects can be determined.

(Processing Steps)

Figure 30:
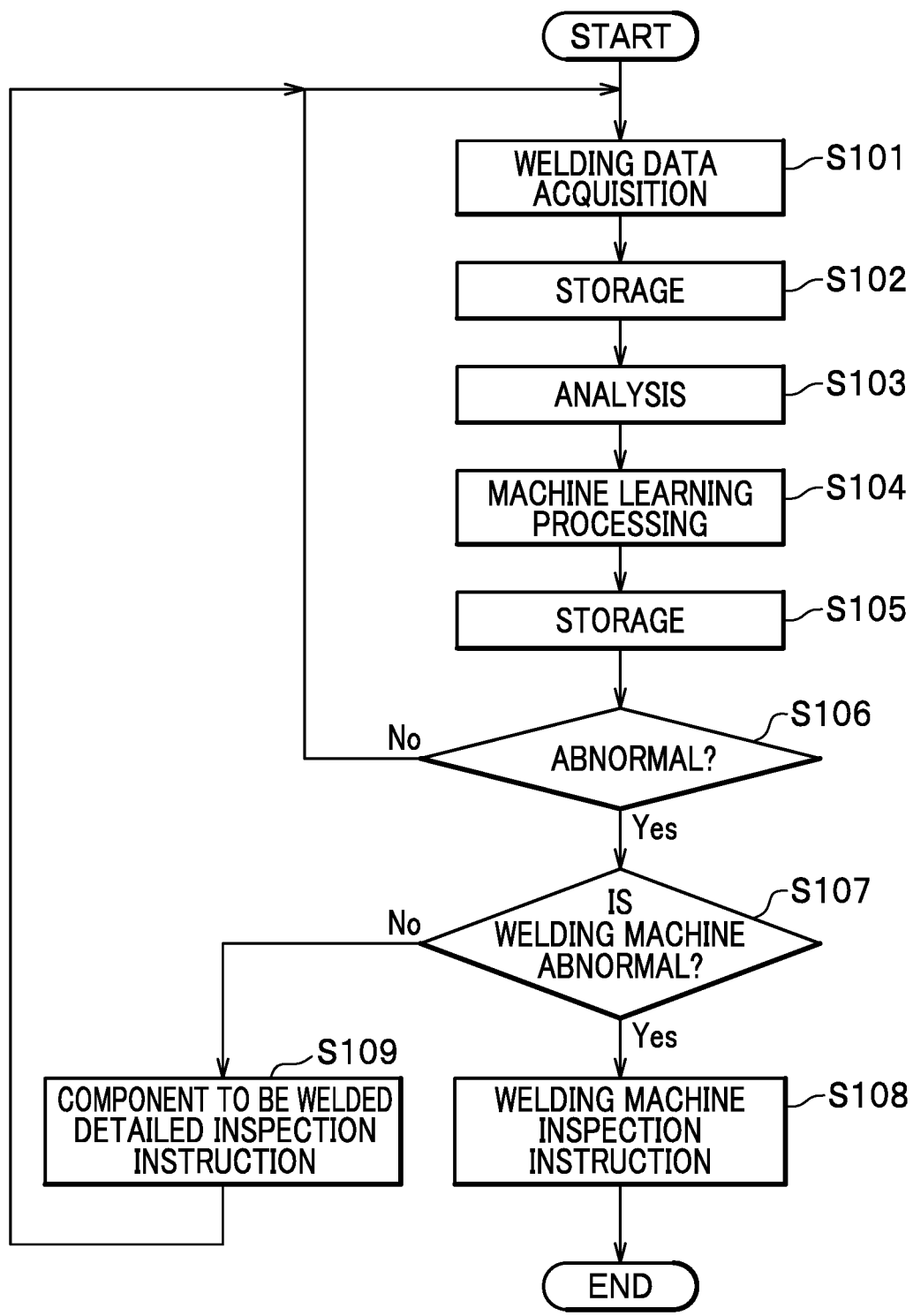
FIG. 30 is a flowchart illustrating processing steps in a server according to the embodiment.

FIG. 30 is a flowchart illustrating processing steps in the server 1 according to the embodiment. FIG. 1 is referred to as needed.

First, the data acquisition processing unit 101 acquires welding data from each device of the information acquisition device 2 and the individual piece identifying device 3 (S101). In addition, the data acquisition processing unit 101 also acquires individual piece identification information from the individual piece identifying device 3 along with the welding data.

The welding data includes current value data acquired from the ammeter 203, image data, spectral data acquired from the high-speed camera 202 and the spectral camera 204, magnetic field data acquired from the magnetic field measuring device 205, displacement data acquired from the displacement meter 206, and voltage value data acquired from the voltmeter 207.

Subsequently, the data acquisition processing unit 101 associates the acquired welding data with the individual piece identification information acquired from the individual piece identifying device 3, and stores the welding data in the welding data storage unit 102 in time series (S102). In step S102, in order to evaluate the relationship between pieces of data included in the welding data, preferably, the data acquisition processing unit 101 extracts the timing of waveform changing point by differentiating the waveform using a common time axis, and the time at which a changing point is extracted is stored as an event time. The event time may be a trigger acquired by the trigger acquisition device 201. At this point, information from the temperature/humidity meter 208 may be stored in the welding data storage unit 102.

Subsequently, the analysis unit 103 performs analysis of acquired welding data as necessary (S103).

The analysis performed by the analysis unit 103 is, for instance, as follows.

Time transition of displacement or displacement speed (change in length) of the component 5 to be welded measured by the displacement meter 206

Spectral analysis of the output waveform acquired from the ammeter 203, the voltmeter 207, and the magnetic field measuring device 205

It is to be noted that the analysis processing in step S103 may be omitted as necessary.

The analysis is performed, in which among the welding data, for signals, the frequency component of the signal waveform is calculated (spectral analysis) by Fourier transform, and the difference from a normal waveform as the reference is calculated. The image data from the high-speed camera 202 is analyzed based on form recognition of the position of the component to be welded and evaluation of the position by image distance measurement.

The data classification unit 104 performs machine learning processing (pattern recognition processing) using the analysis result of each welding data, and the result (in other words, the past data) stored in the data classification storage unit 105 (S104).

The machine learning may include, for instance, the following (1) to (5):

(1) The data classification unit 104 performs pattern recognition on the luminance distribution at a time at which the luminance is the highest in the high-speed camera 204. For instance, a group is formed by the luminance distribution pattern illustrated in FIG. 11, the luminance distribution pattern illustrated in FIG. 12, and the luminance distribution pattern illustrated in FIG. 13. The data classification unit 104 determines a group to which the acquired image belongs. The group is not limited to the above-mentioned example.

As described in FIGS. 11 to 13, it can be seen whether welding is uniformly performed or foreign particles are mixed.

(2) The data classification unit 104 performs pattern recognition on spectral data or one-dimensional spectral data at a specific time which are acquired from the spectral camera 204. For instance, a group is formed by the spectral data pattern illustrated in FIGS. 14A and 14B, the spectral data pattern illustrated in FIGS. 15A and 15B, and the spectral data pattern illustrated in FIGS. 16A and 16B, and the data classification unit 104 determines a group to which the acquired spectral data belongs. Similarly, the data classification unit 104 handles the one-dimensional spectral data. The group is not limited to the above-mentioned example.

(3) The data classification unit 104 performs pattern recognition on the magnetic field signal measured by the magnetic field measuring device 205. For instance, for the magnetic field waveform acquired from each magnetic sensor C101, the data classification unit 104 forms a group in the pattern illustrated in FIG. 24, the pattern illustrated in FIG. 25, the pattern illustrated in FIG. 26, the pattern illustrated in FIG. 27, and the pattern illustrated in FIG. 28. The data classification unit 104 then determines a group to which the acquired magnetic field signal (the magnetic field waveform, the coil output waveform) belongs. It is to be noted that a pattern of the magnetic field waveform, the coil output waveform refers to a combination of magnetic field waveforms acquired from the magnetic sensors C101.

For instance, when three magnetic sensors C101 are provided, a pattern refers to a combination of three magnetic field waveforms in each of FIGS. 24 to 28. Preferably, grouping is performed on both time varying waveforms as illustrated in FIGS. 24 to 28, and the result of spectral analysis performed by the analysis processing in step S103. This is because when the result of spectral analysis is used, the magnetic field signals (the magnetic field waveform, the coil output waveform) including a high frequency component as illustrated in FIGS. 27 and 28 are easily classified into patterns.

The group is not limited to the above-mentioned example.

(4) The data classification unit 104 performs pattern recognition on the current signal and/or the voltage signal measured by the ammeter 203 and the voltmeter 207. For instance, for the current waveform acquired from the ammeter 203 and the voltage waveform acquired from the voltmeter 207, the data classification unit 104 forms a group in the pattern illustrated in FIGS. 18A and 18B, and in the pattern illustrated in FIGS. 19A and 19B. The data classification unit 104 then determines a group to which each of the acquired current signal (current wave form), voltage signal (voltage waveform) belongs. Preferably, grouping is performed on both time varying waveforms as illustrated in FIGS. 18A, 18B, 19A and 19B, and the result of spectral analysis performed by the analysis processing in step S103. This is because when the result of spectral analysis is used, the current signal (current waveform) and voltage signal (voltage waveform) including a high frequency component as illustrated in FIGS. 19A and 19B are easily classified into patterns. The group is not limited to the above-mentioned example.

Thus, it can be determined whether or not the current and voltage supplied from the current source 311 (see FIG. 9) have abnormality.

(5) The data classification unit 104 performs machine learning for displacement speed. Thus, it can be determined whether the mount of weld penetration of the member to be welded is normal or abnormal, and thus determined whether or not welding is performed normally.

The data classification unit 104 stores the result of machine learning in the data classification storage unit 105 (S105).

The comparison determination unit 106 then determines whether or not the welding data to be inspected is abnormal based on the result of machine learning processing (pattern recognition processing) (S106). Abnormality of the welding conditions is determined based on whether or not at least one of pieces of data included in the welding data is abnormal. Specifically, as a result of the machine learning processing in step S104, for each of the pieces of data included in the acquired welding data, the comparison determination unit 106 determines whether or not the piece of data belongs to a group other than the group in which "welding is normal". When the piece of data belongs to a group other than the group in which "welding is normal", the comparison determination unit 106 determines that the welding is "abnormal".

For instance, in the case of (1), when the acquired image is classified into the group (normal group) in the pattern of FIG. 11, the comparison determination unit 106 determines that the welding is "normal". When the acquired image is classified into a group (abnormal group) other than the group in the pattern of FIG. 11, the comparison determination unit 106 determines that the welding is "abnormal".

Also, in the case of (2), when the acquired spectral data is classified into the group (normal group) in the pattern of FIGS. 14A and 14B, the comparison determination unit 106 determines that the welding is "normal". When the acquired spectral data is classified into a group (abnormal group) other than the group in the pattern of FIGS. 14A and 14B, the comparison determination unit 106 determines that the welding is "abnormal".

Furthermore, in the case of (3), when the acquired magnetic signal is classified into the group (normal group) in the pattern of FIG. 24, the comparison determination unit 106 determines that the welding is "normal". When the acquired magnetic signal is classified into a group (abnormal group) other than the group in the pattern of FIG. 24, the comparison determination unit 106 determines that the welding is "abnormal".

In the case of (4), when the acquired current signal and/or voltage signal is classified into the group (normal group) in the pattern of FIGS. 18A and 18B, the comparison determination unit 106 determines that the welding is "normal". When the acquired current signal and/or voltage signal is classified into a group (abnormal group) other than the group in the pattern of FIGS. 18A and 18B, the comparison determination unit 106 determines that the welding is "abnormal".

Also, in the case of (5), when the displacement speed is classified into the group of normal welding, the comparison determination unit 106 determines that the welding is "normal". Otherwise, the comparison determination unit 106 determines that the welding is "abnormal".

Concurrently, as illustrated in FIG. 29B, is determined whether the displacement waveform (the amount of displacement at a predetermined time) E111 is less than (or greater than or equal to) a threshold. When the displacement waveform E111 is less than (or greater than or equal to) a threshold, the comparison determination unit 106 determines that the welding is "abnormal".

The welding may be determined to be abnormal in step S106 when multiple conditions are abnormal rather than when at least one condition is abnormal, where the number of multiple conditions is a predetermined number.

When groups used for machine learning are associated with information on respective types of abnormality, the comparison determination unit 106 determines the type of abnormality based on the group to which the acquired data belongs. When magnetic field waveform is taken as an example, the group of FIG. 24 is normal, the group of FIG. 25 has a variation in the current amount (welding is uneven), the group of FIG. 26 has a variation in the time during which a current flows (welding is uneven), and the group of FIG. 27 has occurrence of sparks (foreign particles are present in the welded part 321). The type of abnormality of the current waveform acquired from the ammeter 203, the voltage waveform acquired from the voltmeter 207, the image of the high-speed camera 202, the spectral data of the spectral camera 204, and in the displacement meter 29 is as described in respective figures.

Association of groups with information on types of abnormality is established by manual input in advance.

When groups used for machine learning are not associated with information on respective types of abnormality or when a new group is formed with acquired data, the comparison determination unit 106 outputs only determination of abnormality.

When the result in step S106 indicates normal welding (S106→No), the processing unit 111 (see FIG. 4) returns the processing to step S101, and processes the next inspection target.

When the result in step S106 indicates abnormal welding (S106→Yes), the comparison determination unit 106 determines whether or not there is a possibility of abnormality (welding machine abnormality) of the welding machine 4. (S107). Determination of whether or not there is a possibility of abnormality of the welding machine 4 is made based on whether the same condition (analysis result) is determined to be abnormal a predetermined number of times continuously. For instance, the case where the luminance distribution in an image acquired from the high-speed camera 202 continuously indicates abnormality.

When the result in step S107 indicates a possibility of abnormality of the welding machine 4 (S107→Yes), the PLC 7 provides instructions for inspection (welding machine inspection) of the welding machine 4 (S108). When instructions for inspection of the welding machine 4 are provided, the welding machine 4 is stopped, then the welding machine 4 is inspected. The instructions in step S108 preferably include information on the types of abnormality. In this manner, the cause of the abnormality is easily identified.

When the result in step S107 indicates no possibility of abnormality of the welding machine 4 (S107→No), the PLC 7 instructs the inspection device 6 to inspect (component to be welded detailed inspection) the component 5 to be welded in detail (S109). When the type of abnormality is known by the determination processing in step S106, the instructions in step S109 include the information on the types of abnormality. When the type of abnormality is not known by the determination processing in step S106, the instructions in step S109 may include information indicating that presumed type of abnormality is unknown.

The instructions in step S109 preferably include information on conditions which exhibit abnormality. In this manner, the cause of the abnormality is easily identified.

The inspection device 6, which is instructed to perform inspection, inspects the relevant component 5 to be welded in detail. The results of detailed inspection are fed back to the data classification unit 104 via the inspection information input device 8. Consequently, groups in the data classification storage unit 105 are associated with information on the types of abnormality (causes if possible) by manual input. In this manner, the accuracy of machine learning can be improved, thus the accuracy of abnormality determination in step S106 can be improved.

After step S109, the processing unit 111 (see FIG. 4) returns the processing to step S101, and processes the next inspection target.

In this manner, the manufacturing system Z according to the embodiment acquires local information in the welded part 321 of the component 5 to be welded for each welding, and at the same time, compares the acquired information with the past information (data of the data classification storage unit 105). Furthermore, the manufacturing system Z provides a manufacturing system for manufacturing production while determining whether or not welding is normal using abnormal values as indexes (group), thereby making it possible to improve the quality of welding, while maintaining an improved productivity of a factory line having a welding process.

According to the embodiment, it is possible to obtain local temperature information of the welded part 321 (see FIG. 8) from the luminance distribution from the high-speed camera 202. In addition, it is possible to obtain local current information in the welded part 321 from the magnetic field signal measured by the magnetic field measuring device 205. In the embodiment, it is determined whether or not local welding conditions are abnormal using these local temperature information and current information. Thus, in the embodiment, it is possible to detect abnormality of welding due to poor contact performance of the welded part 321, or mixture of foreign particles into the welded part 321 even when overall welding conditions, such as the members 301, 302 to be welded, and a current flowing through the members 301, 302 to be welded, are apparently appropriate.

In the embodiment, time transition of a local current or the frequency of a local current is evaluated based on a light emission pattern in a captured image, and a magnetic field signal measured by the magnetic field measuring device 205. Thus, local welding conditions are calculated. Then the calculated local welding conditions are recorded and managed for individual piece of welding, and fed back to the inspection process and the welding conditions. Thus, the quality control can be improved. That is, a workpiece in which appropriate welding is not performed is inspected in detail, and an inspection result is reflected to the manufacturing system Z and the welding monitoring system Z1, thereby making it possible to improve the quality control.

In addition, according to the embodiment, inspection can be performed in the manufacturing process of the component 5 to be welded. In other words, manufacturing and inspection of the component 5 to be welded can be performed concurrently. In general, an inspection time is extremely longer than a production time, however, according to the embodiment, manufacturing and inspection of the component 5 to be welded can be performed concurrently, and thus overall production time can be reduced.

Furthermore, according to the embodiment, total inspection can be achieved without significantly increasing the inspection time.

In addition, determination with high accuracy can be autonomously performed using a result of machine learning for determining whether or not welding conditions as an inspection target are abnormal.

The present invention is not limited to the above-described embodiment, and various modifications are included. For instance, the embodiment has been described in detail in order to explain the present invention in a simple manner, the present invention is not necessarily limited to the embodiment which includes all the components explained.

Although the embodiment assumes inspection related to resistance welding, the invention may be applied to another welding as long as a current flows, and the welding is performed using heat generated by the current.

Also, when time series spectral analysis of an image captured by the high-speed camera 202 is possible, the spectral camera 204 does not need to be included.

When determining abnormality of welding, the comparison determination unit 106 may include information, for instance, as a list in a component to be welded detailed inspection instruction, the information being related to welding individual piece in the same group as the welding individual piece determined to be abnormal. Here, the group has been classified by the above-mentioned machine learning. Also, the information related to welding individual piece is information which identifies the welding individual piece. The information related to welding individual piece may include a photograph of the welding individual piece, welding conditions at the time of welding of the welding individual piece, and a result of the detailed inspection.

Also, although the embodiment assumes analysis at the time when the luminance is the highest in the analysis of an image from the high-speed camera 202, analysis is not limited to this. When the welded part 321 is cooled, the cooling rate is reduced at a portion where welding is poor and a portion where foreign particles are present. For this reason, the data classification unit 104 may perform group classification based on the luminance distribution after a predetermined time since current application. Alternatively, the comparison determination unit 106 may determine the presence or absence of abnormality based on whether or not there is a position at which the luminance is higher than or equal to a predetermined value after a predetermined time since current application. In this manner, the accuracy of welding determination can be improved.

Alternatively, the comparison determination unit 106 may determine excess or deficiency of an applied current based on whether the average value of luminance is higher or lower than a predetermined value in the analysis of an image from the high-speed camera 202. Alternatively, the comparison determination unit 106 may determine excess or deficiency of the current value, voltage value applied, based on the peak values of current waveform and voltage waveform. In this case, information on the excess or deficiency of the current value, voltage value applied is sent to the MES 11. The MES 11 then controls the current value, voltage value applied by the welding machine 4, based on the sent information on the excess or deficiency of the current value, and voltage value. In this manner, the yield can be improved, and an adjustment time for the current value, voltage value applied to the component 5 to be welded can be reduced.

Also, part or all of the above-described configuration, functions, the units 101, 103, 104, 106, the welding data storage unit 102, and the data classification storage unit 105 may be implemented with hardware by designing an integrated circuit, for instance. Also, as illustrated in FIG. 4, the above-described configuration, functions, and the like may be implemented with software by a processor such as the CPU 120 interpreting and executing programs which implement respective functions. The information on programs, tables, files which implement respective functions can be stored in a recording device such as, the memory 110, an SSD (Solid State Drive), or a recording medium, such as IC (Integrated Circuit) card, SD (Secure Digital) card, DVD (Digital Versatile Disc) in addition to a HD (Hard Disk).

Also, in each embodiment, control lines and information lines, which are considered to be necessary for explanation, are shown, and all control lines and information lines for the product are not necessarily shown. Actually, almost all components may be considered to be connected to each other.

REFERENCE SIGNS LIST 1 server
2, 31, 32 information acquisition device
3 individual piece identifying device
4 welding machine
5 component to be welded
6 inspection device
7, 21, 22 PLC
8 inspection information input device
11 MES
12 trend server
13 processing machine
101 data acquisition processing unit
102 welding data storage unit
103 analysis unit
104 data classification unit
105 data classification storage unit
106 comparison determination unit (determination unit)
111 processing unit
201 trigger acquisition device
202 high-speed camera (temperature measuring unit)
203 ammeter
204 spectral camera
205 magnetic field measuring device (current measuring unit, magnetic field measuring unit)
206 displacement meter (displacement measuring unit)
207 voltmeter
208 temperature/humidity meter
301, 302, 331 member to be welded
303, 304 electrode
311 current source
312 switch
321 welded part
Z manufacturing system
Z1 welding monitoring system
Z2 welding system

The invention claimed is:
1. A welding monitoring system comprising:
a current measuring unit configured to measure a local current at a welded part in resistance welding of a component to be welded;
a temperature measuring unit configured to measure a local temperature at the welded part;
a data acquisition processing unit configured to acquire welding data for the welded part from at least the current measuring unit and the temperature measuring unit;
a data classification unit configured to classify the welding data using machine learning and store, in a data storage, machine learning results that classify past current information and past temperature information;
a determination unit configured to:
generate, based at least on the machine learning results that classify the past current information and the past temperature information, a normal group and an abnormal group, and
determine whether or not at least one of the current information acquired from the current measuring unit or the temperature information acquired from the temperature measuring unit is abnormal based at least on comparing the current information acquired from the current measuring unit with the past current information and comparing the temperature information acquired from the temperature measuring unit with the past temperature information;
a programmable logic controller configured to output an inspection instruction based on a determination that at least one of the current information acquired from the current measuring unit or the temperature information acquired from the temperature measuring unit is abnormal;
an inspection device configured to perform an inspection of the welded part based on receiving the inspection instruction from the programmable logic controller; and
an inspection information input device configured to provide results of the inspection to the data classification unit to improve an accuracy of the machine learning.

2. The welding monitoring system according to claim 1, wherein the current measuring unit is a magnetic field measuring unit disposed in a vicinity of the welded part, and
the local current is measured based on an intensity of a magnetic field measured by the magnetic field measuring unit.

3. The welding monitoring system according to claim 1, wherein the temperature measuring unit is a camera, and
the local temperature is measured based on a luminance distribution in an image, acquired from the camera, of the welded part.

4. The welding monitoring system according to claim 1, further comprising
a spectral camera,
wherein the determination unit is configured to determine whether or not at least one of the current information acquired from the current measuring unit, the temperature information acquired from the temperature measuring unit, and the frequency distribution, acquired from the spectral camera, of the welded part is abnormal by comparing a frequency distribution, acquired from the spectral camera, of the welded part with a past frequency distribution.

5. The welding monitoring system according to claim 1, further comprising
a displacement measuring unit configured to determine displacement information for the welded part by measuring a change in length of the component to be welded which is subjected to the resistance welding,
wherein the determination unit is configured to determine whether or not at least one of the current information acquired from the current measuring unit, the temperature information acquired from the temperature measuring unit, and the change in length, obtained from the displacement measuring unit, of the component to be welded is abnormal based at least on comparing the current information acquired from the current measuring unit with the past current information, comparing the temperature information acquired from the temperature measuring unit with the past temperature information, and comparing the change in length obtained from the displacement measuring unit with past displacement information.

6. The welding monitoring system according to claim 1, wherein the determination unit is connected to a MES (Manufacturing Execution System).

* * * * *